United States Patent
Mori et al.

(10) Patent No.: US 7,556,912 B2
(45) Date of Patent: Jul. 7, 2009

(54) OPTICAL INFORMATION RECORDING MEDIUM, REPRODUCTING METHOD USING THE SAME, AND OPTICAL INFORMATION PROCESSING DEVICE

(75) Inventors: Go Mori, Nara (JP); Masaki Yamamoto, Yamatokoriyama (JP); Hideharu Tajima, Izumi (JP); Nobuyuki Takamori, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 872 days.

(21) Appl. No.: 10/862,187

(22) Filed: Jun. 4, 2004

(65) Prior Publication Data

US 2005/0007937 A1 Jan. 13, 2005

(30) Foreign Application Priority Data

Jun. 6, 2003 (JP) ............................. 2003-162882
May 24, 2004 (JP) ............................. 2004-153825

(51) Int. Cl.
*G11B 7/24* (2006.01)
(52) U.S. Cl. .............................. 430/270.13; 369/275.2; 430/64.2; 430/945
(58) Field of Classification Search .................. None
See application file for complete search history.

(56) References Cited

U.S. PATENT DOCUMENTS

| 4,006,378 A | 2/1977 | Silverstein et al. |
| 5,420,846 A | 5/1995 | Sugiyama et al. |
| 5,474,874 A | 12/1995 | Asai et al. |

(Continued)

FOREIGN PATENT DOCUMENTS

EP 0449121 A2 10/1991

(Continued)

OTHER PUBLICATIONS

U.S. Appl. No. 10/713,349, filed Nov. 14, 2003, Optical Information Recording Medium, Recording and Reproduction Methods Using the Same, Optical Information Recording Device, and Optical Information Reproduction Device.

(Continued)

*Primary Examiner*—Joseph Feild
*Assistant Examiner*—Tawfik Goma
(74) *Attorney, Agent, or Firm*—Edwards Angell Palmer & Dodge LLP; David G. Conlin; David A. Tucker

(57) ABSTRACT

An optical information recording medium of the present invention includes a thin film section made up of one or more thin film, the thin film section being provided on a substrate. Thin films of the thin film section include a single optical multiple interference film which incites optical multiple interference in a thin film section, the optical multiple interference being incited by the change of complex refractive index in accordance with the intensity of incident light. Also, the composition and thickness of the optical multiple interference film are arranged in such a manner as to cause the wavelength distribution of the reflectance of the thin film section at room temperatures to have a minimum value within wavelengths of ±80 nm of the incident light for reproduction. With this, the design freedom of the optical multiple interference film which realizes super-resolution reproduction with a reduced effective reproduction spot is significantly increased.

2 Claims, 20 Drawing Sheets

U.S. PATENT DOCUMENTS

| | | | |
|---|---|---|---|
| 5,516,568 A | 5/1996 | Jung | |
| 5,529,864 A | 6/1996 | Tachibana et al. | |
| 5,569,517 A | 10/1996 | Tominaga et al. | |
| 5,591,500 A * | 1/1997 | Kawanishi | 428/64.1 |
| 5,610,879 A | 3/1997 | Moriya et al. | |
| 6,187,406 B1 | 2/2001 | Ichihara et al. | |
| 6,339,582 B1 | 1/2002 | Ichihara et al. | |
| 6,524,766 B1 * | 2/2003 | Ariyoshi et al. | 430/270.13 |
| 6,551,679 B1 | 4/2003 | Kuroda et al. | |
| 6,589,657 B2 * | 7/2003 | Dannenberg | 428/432 |
| 6,790,502 B1 | 9/2004 | Yamamoto et al. | |
| 6,844,092 B2 * | 1/2005 | Yamamoto et al. | 428/702 |
| 6,961,300 B2 | 11/2005 | Cheong et al. | |
| 2001/0038900 A1 * | 11/2001 | Todori et al. | 428/64.4 |
| 2002/0098315 A1 | 7/2002 | Tabata | |
| 2003/0193857 A1 | 10/2003 | Ichihara et al. | |
| 2005/0117505 A1 | 6/2005 | Takamori et al. | |

FOREIGN PATENT DOCUMENTS

| | | |
|---|---|---|
| EP | 0580346 A2 | 1/1994 |
| JP | 52-44082 | 4/1977 |
| JP | 05-012673 A | 1/1993 |
| JP | 05-012715 A | 1/1993 |
| JP | 06-028713 A | 2/1994 |
| JP | 06-243508 A | 9/1994 |
| JP | 07-223372 A | 8/1995 |
| JP | 08-096412 A | 4/1996 |
| JP | 08-111035 A | 4/1996 |
| JP | 08-124217 A | 5/1996 |
| JP | 10-320857 | 12/1998 |
| JP | 11-273148 | 10/1999 |
| JP | 2001-032935 A | 2/2001 |
| JP | 2001-035011 A | 2/2001 |
| JP | 2001-035012 A | 2/2001 |
| JP | 2001-056961 A | 2/2001 |
| JP | 2001-067727 A | 3/2001 |
| JP | 2001-067731 A | 3/2001 |
| JP | 2001-084643 | 3/2001 |
| JP | 2001-084645 A | 3/2001 |
| JP | 2001-101707 A | 4/2001 |
| JP | 2001-189033 | 7/2001 |
| JP | 2001-202657 A | 7/2001 |
| JP | 2001-243657 A | 9/2001 |
| JP | 2001-273679 | 10/2001 |
| JP | 2002-025057 A | 1/2002 |
| JP | 2002-056573 A | 2/2002 |
| JP | 2002-109786 A | 4/2002 |
| JP | 2002-298439 A | 10/2002 |
| JP | 2002-367230 A | 12/2002 |
| JP | 2003-091875 A | 3/2003 |
| JP | 2003-123318 | 4/2003 |
| JP | 2003-162843 | 6/2003 |
| JP | 2003-195374 | 7/2003 |
| WO | WO-01/27689 A1 | 4/2001 |
| WO | WO-02/058060 A1 | 7/2002 |
| WO | WO-03/075268 A1 | 9/2003 |

OTHER PUBLICATIONS

U.S. Appl. No. 10/804,328, filed Mar. 18, 2004, Optical Information Recording Medium, Recording and Readout Methods Using the Same, Optical Information Recording Device, and Optical Information Readout Device.

U.S. Appl. No. 10/824,926, filed Apr. 14, 2004, Optical Data Recording Medium and Method for Reproducing Recorded Data.

T. Shintani, et al., *A New Super-Resolution Film Applicable to Read-Only and Rewritable Optical Disks*, Japanese Journal of Applied Physics, vol. 38 (1999), pp. 1656-1660, Mar. 1999.

M. Yamamoto, et al., *Super Resolution Optical Disc with Reflectance Control Thin Film*, International Symposium on Optical Memory 2003, pp. 144-145, Nov. 3-7, 2003.

*Extended Abstracts* (*Proceedings of the 64th Autumn Meeting, 2003*), The Japan Society of Applied Physics No. 3, Aug. 30-Sep. 2, 2003 (7 pp).

* cited by examiner

OPTICAL INFORMATION RECORDING MEDIUM, REPRODUCTING METHOD USING THE SAME, AND OPTICAL INFORMATION PROCESSING DEVICE

This Nonprovisional application claims priority under 35 U.S.C. § 119(a) on Patent Application No. 2003/162882 filed in Japan on Jun. 6, 2003 and Patent Application No. 2004/153825 filed in Japan on May 24, 2004, the entire contents of which are hereby incorporated by reference.

FIELD OF THE INVENTION

The present invention relates to an optical information recording medium which can record/reproduce information or reproduce information using light, and more particularly to an optical information recording medium employing super-resolution medium technology which makes it possible to read recording marks that cannot be read with an optical resolving power determined by a diffraction-limited optical spot size, a reproduction method using the optical information recording medium, and an optical information processing device.

BACKGROUND OF THE INVENTION

The recent progress of informatization, information-communication, and multimedia technologies has created strong demands for high-density and high-capacity optical information recording media. The upper limit of the recording density of an optical information recording medium is essentially determined by a spot size of an optical beam for recording and reproducing information. An optical spot size is substantially represented as $\lambda/NA$ where $\lambda$ indicates the wavelength of a light source and NA indicates the numerical aperture of an object lens for forming an optical spot. As the optical spot size decreases, the recording density increases.

However, it is considered that the wavelength $\lambda$ of the light source cannot be shortened beyond the wavelength of ultraviolet light due to the adsorption by an optical element and the limitation of sensitivity characteristics of a detector, and the NA is also limited by the maximum allowable tilt of the medium. On this account, there is a limit to the increase of the recording density by reducing the optical spot size.

To overcome this limit, super-resolution medium technology with which an effective optical spot size is reduced through the use of optical characteristics of a recording medium has been proposed. According to such super-resolution medium technology, an effect of masking a recording mark is produced by utilizing the changes in a temperature distribution and transmittance of a recording medium due to an optical spot thereon, so that an effective spot contributing to recording and reproduction is reduced and thus the recording/reproduction density is increased.

FIG. 21 schematically illustrates the above-mentioned medium super-resolution effect. An optical spot 111 scans a super-resolution medium relatively in the direction of an arrow 113, thus recording/reproduction being carried out. In a normal reproduction, all of the recording marks 112 within the optical spot 111 contribute to produce a reproduction signal. Meanwhile, in the case of the super-resolution medium, the optical spot 111 is masked with the exception of a central area 111a where the light is intense, and only a recording mark 112a within the central area 111a is read. This produces an effect as if an effective optical spot size contributing the reproduction is reduced. On the contrary to the example of FIG. 21, there is an alternative arrangement such that the central area 111a is masked so that a recording mark 112 in a peripheral area 111b within the optical spot 111 is read.

Conventional examples of such super-resolution medium technology are:

(1) Super-resolution reading technology using a mask with organic dye;
(2) Super-resolution technology using a photochromic mask layer; and
(3) Super-resolution technology using an inorganic oxide layer.

Adopting an organic material as a mask layer, a medium in accordance with the methods (1) and (2) using organic dye and photochromic tend to be degraded by heat and can be read only about not more than 10,000 times, so as not to have sufficient reliability for information reproduction and thus have not been in practical use. Furthermore, due to the degradation by heat, these methods (1) and (2) cannot be adopted to produce rewritable disks.

In the meantime, regarding the super-resolution technology (3) adopting an inorganic oxide layer, Non-Patent Document 1 (Japan Journal of Applied Physics 38; (1999); p. 1656) teaches that a disk with an inorganic oxide super-resolution film can be read for not less than a million times, and a phase-change medium adopting this inorganic oxide super-resolution film is rewritable. This is because, since the super-resolution film is made of an inorganic material, the film has a heat resistance better than that of organic materials such as a mask using organic dye and a photochromic layer. For this reason, the inorganic oxide super-resolution film in accordance with the technology (3) has been prospective as a super-resolution material utilized for both read-only disks and rewritable disks.

Meanwhile, Patent Document 1 (Japanese Laid-Open Patent Application No. 2001-84643; published on Mar. 30, 2001) discloses an optical information recording medium in which a film such as a Co—Si—Na—Ca—O film and a $Co_3O_4$ film is adopted as the above-mentioned inorganic oxide super-resolution film, and the reflectance of a film stack increases as incoming light intensifies. This arrangement is contrived to tackle the following problem: If the reflectance is lowered due to the change of the complex refractive index of the inorganic oxide super-resolution film, an effective reproduction spot is broadened so that a reproduction signal amplitude characteristic enough to improve the recording density cannot be obtained.

According to Patent Document 1, moreover, the inorganic oxide super-resolution film (hereinafter, inorganic super-resolution film) has such a characteristic that the complex refractive index changes with the application of a laser beam exceeding a predetermined threshold. When this inorganic super-resolution film is adopted to an optical disk, the optical disk has a multi-layered structure, the inorganic super-resolution film being one of the multi-layers. On the occasion of playing the optical disk, the complex refractive index of the organic super-resolution film changes at a central part of the optical spot where a temperature is high, the reflectance in a complex refractive index changing area changes due to an optical multiple interference in the film stack, and as a result a signal corresponding to a part of the optical spot is enhanced and read, so that an effective spot size contributing to reproduction is reduced.

Incidentally, functions of such a film stack adopting the inorganic super-resolution film are effectively improved by increasing the range of the reflectance change of the film stack. To increase the range of the reflectance change of the film stack, it is effective to fully exploiting the optical multiple interference of the film stack.

However, according to Patent Document 1, for instance, the inorganic super-resolution film used in the patent document 1 is 50 nm thick and has a complex refractive index n−ki (i is an imaginary number) where a refractive index n before the change is 2.48 and an extinction coefficient k is 0.48, and when the incoming light intensifies, the refractive index and the extinction coefficient are changed to n=2.41 and k=0.57, respectively. When the extinction coefficient k is such a large value, it is impossible to effectively increase the range of the reflectance change in the film stack.

That is to say, when the extinction coefficient k is such a large value, light is absorbed in the process of passing through the inorganic super-resolution film, so that the inorganic super-resolution film is practically seen as a semitransparent film. Such a semitransparent inorganic super-resolution film absorbs light in the course of repeating the optical multiple interference, and hence one cannot fully exploit the optical multiple interference.

For instance, light absorption by an inorganic super-resolution film which is 50 nm thick and has an extinction coefficient k of 0.48 is examined as below. If the multiple interference is ignored in order to examine the absorption in a simple manner, the intensity of light passing through the film is represented by the following equation.

$$I = I_0 \times \exp(-\alpha x)$$

where $I_0$ is the intensity of incoming light, I is the intensity of the passing light, x is a film thickness, and $\alpha$ is an absorption coefficient, and $$\alpha = 4\pi k/\lambda.$$

where $\lambda$ is the wavelength of the incoming light.

According to this equation, as the thickness x increases, or as the extinction coefficient k increases, the intensity I of the passing light exponentially decreases.

Since the light source wavelength $\lambda$ is 660 nm in this example, the transmittance (=the intensity of the passing light/the intensity of the incoming light) is 63% according to the equation above. However, in accordance with the recent demands for high-density optical information recording media, the light source wavelength has been shortened, and in this connection optical information recording media utilizing blue light with 400 nm wavelength have been in practical use. When the light source wavelength is 400 nm in the example above, the transmittance is reduced to 47%.

Note that, in the present equation the multiple interference is ignored for describing the absorption in a simple manner. When the multiple interference is taken into consideration, the light beams attenuate each other so that the transmittance is further lowered.

Thus, according to the present example, in a recent optical system with 400 nm wavelength, an amount of light is reduced to be not more than half as much as an amount of the incoming light, after only passing through the inorganic super-resolution film. For this reason, it is impossible to fully exploit the multiple interference, and this should be problematic in terms of the efficiency of the use of light.

The range of the reflectance change of the film stack can be increased by increasing the thickness of the inorganic super-resolution film so as to enhance the effects of the change of the refractive index. However, when the inorganic super-resolution film is semitransparent, light cannot pass through a thickened inorganic super-resolution film, and hence it is impractical to increase the thickness of the inorganic super-resolution film.

For instance, according to the equation above, when the thickness is doubled to 100 nm, the transmittance is significantly reduced from 63% to 40% with the light source wavelength of 660 nm, and from 47% to 22% with the light source wavelength of 400 nm. The reduction is particularly significant in short wavelengths, and this hampers the use of the multiple interference and efficient use of light.

In particular, since the efficiency of the use of light in the film stack is reduced when the inorganic super-resolution film is semitransparent, it is not possible to adopt a multi-layered recording section structure in which recording layers for recording information and recording surfaces recording information with irregularities thereon are deposited. Note that, hereinafter, a film stack (thin-film section) including a recording layer, a recording surface, and a film stack (thin-film section) contacting the recording surface are all regarded as recording sections.

To increase the reflectance change without changing the thickness of the inorganic super-resolution film, it is necessary to increase the change of the complex refractive index. However, since the change of the complex refractive index is an inherent property of a material, this approach would make little improvements.

In the meantime, patent document 2 (Japanese Laid-Open Patent Application No. 2001-189033 (Tokukai 2001-189033; published on Jul. 10, 2001)) teaches that, to maximize the reflectance change in the reproduction wavelength, a super-resolution reproduction film is modified in such a manner as to minimize the reflectance of an optical recording medium at the initial refractive index, the super-resolution reproduction film has an extinction coefficient of 0, and an interference film stack (in which films with a high refractive index and films with a low refractive index are deposited in an alternate manner) which gives rise to multiple reflections and interference in the optical recording medium is provided between the super-resolution reproduction film and a reflective film.

However, in the optical recording medium of Document 2, the multiple reflections occur through the interference film stack, thereby involving reflection due to the difference between the refractive indices at the interface of neighboring films. This decreases the efficiency of the use of light and gives rise to signal noise and failure in a servo. For this reason, the interference film stack deteriorates the signal quality.

Furthermore, the refractive index of the film and the thickness of the film cannot be easily adjusted. Thus, providing the interference film stack increases the number of manufacturing steps of the optical recording medium and increases the manufacturing costs thereof.

SUMMARY OF THE INVENTION

The objective of the present invention is to provide an optical information recording medium which (i) has a thin film section (film stack) including a super-resolution film, the degree of the reflectance change in the thin film section being significantly large, and (ii) has a high design freedom, an optical information reproducing method using the optical information recording medium, and an optical information processing device using the optical information recording medium.

To achieve the above-described objective, the optical information recording medium of the present invention is characterized by comprising: a thin film section made up of at least one thin film, the thin film section being provided on a substrate, and reflectance of the thin film section changing in accordance with a change of optical multiple interference in the thin film section, said at least one thin film of the thin film section including a single optical interference film in which a complex refractive index changes in accordance with intensity of incident light, thereby triggering the optical multiple interference in the thin film section, and composition and a thickness of the optical multiple interference film are determined in such a manner as to cause wavelength distribution of reflectance of the thin film section at room temperatures to have a minimum value within ±80 nm of an wavelength of incident light for reproduction.

According to this arrangement, when a light beam is applied to the optical information recording medium, the change of the complex refractive index occurs in a part of an optical multiple interference film (or a complex refractive index changing film) in the optical spot, in the part the intensity of the incident light exceeding a threshold value and the part being in an optical spot. As a result of this change, the optical multiple interference in the thin film section changes, so that the reflectance of the thin film section changes. Thus, since the reflectance of a part in the optical spot changes in accordance with the intensity of the incident light, the light reflected on the area is enhanced or masked. With this arrangement, a recording bit in a area smaller than the optical spot covering the area is read in an enhanced manner, so that the super-resolution reproduction is realized with a reduced effective reproduction spot.

The change of the complex refractive index in accordance with the intensity of the light in the optical multiple interference film may be directly incited by the incident light, or may be incited by a temperature change due to the temperature rise in the thin film section caused by the application of the incident light.

Since the single optical multiple interference film is included in the aforesaid at least one thin film of the thin film section, the optical multiple interference occurs virtually due to the repeating reflections on the light-incident surface and the opposing surface of the optical multiple interference film. Thus, the effect of light absorption in the optical multiple interference film is enhanced, so that the degree of the change of the complex refractive index is effectively increased. In particular, when the complex refractive index of the optical multiple interference film changes in accordance with the temperature change, the temperature change due to the light absorption in the optical multiple interference film is great, making it possible to effectively change the complex refractive index.

Moreover, comparing to a case that a transparent film which repeatedly reflects light is provided in addition to the optical multiple interference film, the thickness of the optical multiple interference film can be further thickened. Thus, it is possible to further enhance the change of the reflectance in the thin film section, by increasing the thickness of the optical multiple interference film.

Moreover, comparing to a case that a transparent film which repeatedly reflects light is provided in addition to the optical multiple interference film, the state of the optical multiple interference can be mainly controlled only by adjusting the thickness and refractive index of the optical multiple interference film. This makes it easy to manufacture the optical information recording medium, and decrease the manufacturing costs thereof.

For these reasons, the control of the state of optical interference and the manufacture of the medium become easy. Furthermore, the efficiency of the use of light is improved, so that the sensitivity to the optical power is improved.

The composition and thickness of the optical multiple interference film is arranged in such a manner as to cause the distribution of the reflectance to the wavelength (hereinafter, this distribution of the reflectance to the wavelength will be at times referred to as wavelength distribution) of the thin film section to have a minimum value within ±80 nm of the wavelength of the incident light for reproduction in a case that the wavelength distribution of the reflectance is obtained at room temperatures, i.e. in the state of no change in the complex refractive index of the optical multiple interference film (in other words, in such a state that a converging light beam which makes it possible to acquire a reproduction signal from the optical information recording medium is not applied to the optical information recording medium). This indicates that the optical information recording medium of the present invention is not limited to the antireflection structure with which the reflectance is minimized at room temperatures. That is to say, when the reflectance of the thin film section at room temperatures is minimized with respect to the wavelength of the incident light for reproduction, the optical information recording medium has an antireflection structure. On the other hand, when the reflectance of the thin film section at room temperatures is not minimized with respect to the wavelength of the incident light for reproduction, the optical information recording medium does not have an antireflection structure.

The optical information recording medium of the present invention is not limited to the antireflection structure, because the optical multiple interference film is a single layer and the reflectance change is enhanced due to the single layer without adopting the antireflection structure. Thus, the composition and thickness of the optical multiple interference film can be arranged with a high degree of freedom.

In the optical information recording medium of the present invention, the thickness of the optical multiple interference film is determined in such a manner as to set the reflectance of the thin film section at room temperatures to be more than a minimum value of the wavelength distribution of the reflectance and less than a maximum value of the wavelength distribution of the reflectance, the minimum value and the maximum value being adjacent to each other.

With this, a wide range between the adjacent minimum and maximum values of the reflectance can be used for setting the reflectance of the thin film section at room temperatures, making it possible to easily design the optical multiple interference film. This is because, as described above, in the present invention the reflectance change can be magnified without adopting the antireflection structure, as only one optical multiple interference film is provided.

For a fuller understanding of the nature and advantages of the invention, reference should be made to the ensuing detailed description taken in conjunction with the accompanying drawings.

DESCRIPTION OF THE EMBODIMENTS

The following will describe an embodiment of the present invention with reference to FIGS. 1 through 25.

First, what will be described are essential parts of a recording/reproduction device (optical information processing device) which can record/reproduce information to/from an optical information recording medium of the present invention.

The recording/reproduction device includes a laser light source, optical collector means, relative movement means, photoelectric conversion means, servo means, address information detecting means, reproduction signal demodulation circuit, and so on.

As the laser light source, a device such as a semiconductor laser emitting light with a wavelength of 405 nm is adopted. The optical collector means forms laser light emitted from a laser device into a light beam and collects the light beam onto the surface of the optical information recording medium. The optical collector means includes optical components such as a collective lens and a beam splitter.

The relative movement means moves the optical collector means and the optical information recording medium so as to determine the relative locations thereof. The relative movement means is made up of a linear actuator, a swing arm, and the like. The optical collector means and the optical information recording means are moved in at least one of the following manners: the optical information recording medium is caused to rotate or horizontally move; and the collective lens of the optical collector means is caused to move in the direction orthogonal to the optical axis.

The photoelectric conversion means converts the level of intensity of light reflected on the optical information recording medium into an electric signal. The servo means carries out auto-focus and tracking of laser light.

The address information detecting means detect address information in an electric signal acquired by reading an address information mark provided on the optical information recording medium. The reproduction signal demodulation circuit reproduces recorded information embedded in light reflected on the optical information recording medium.

Among these components, the laser light source, optical collector means, photoelectric conversion means, and servo means are stored in an optical head which is, by the relative movement means, moved relative to the optical information recording medium. The laser light source and photoelectric conversion means may be stored in a case in which the optical collector means is not provided.

The recording/reproduction device preferably includes means for adjusting the angle between the collected laser light and the optical information recording medium. This prevents the degradation of an optical spot owing to the occurrence of aberration.

Figure 20:
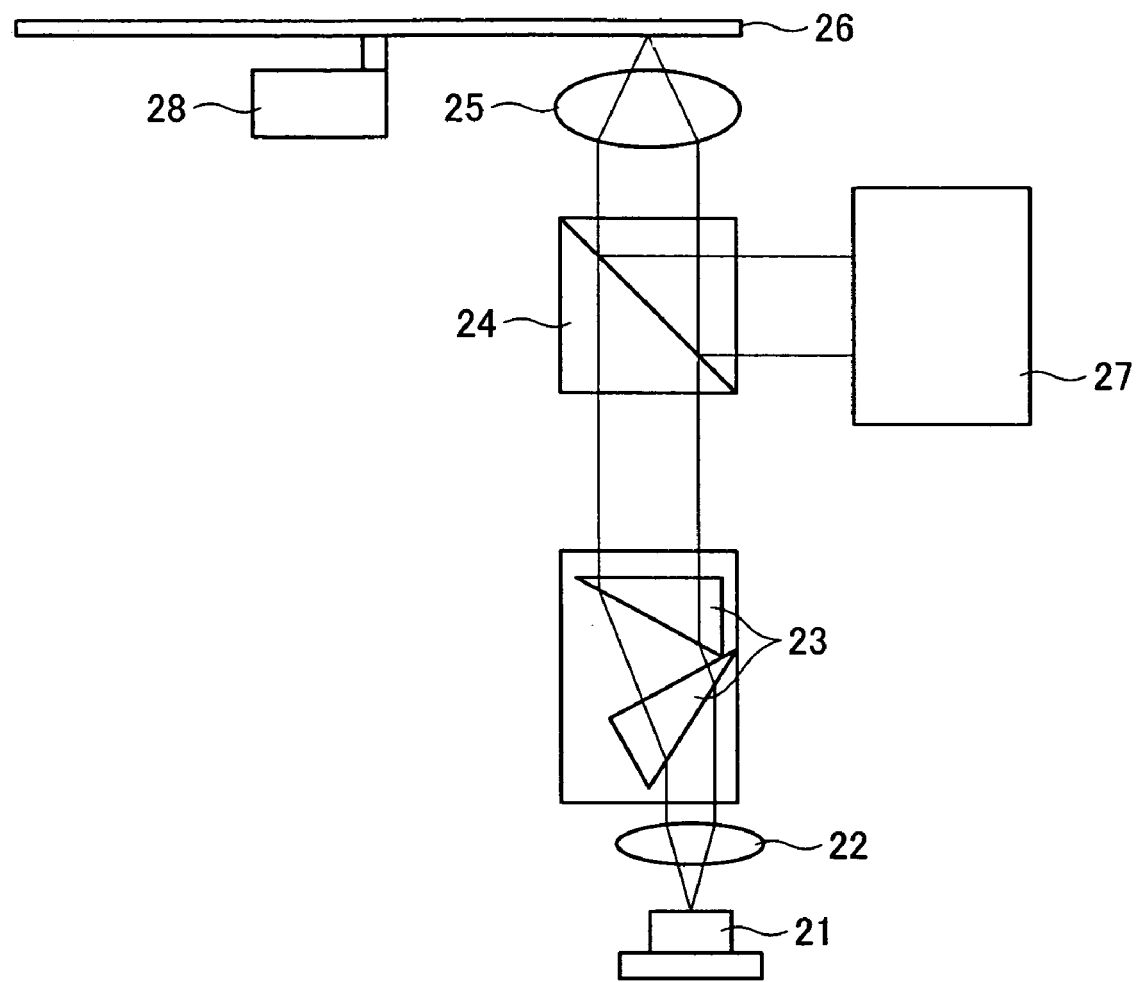
FIG. 20 is a schematic drawing showing an optical system of a recording/reproduction device which can record/reproduce information using the optical information recording medium of the present invention.
Figure 21:
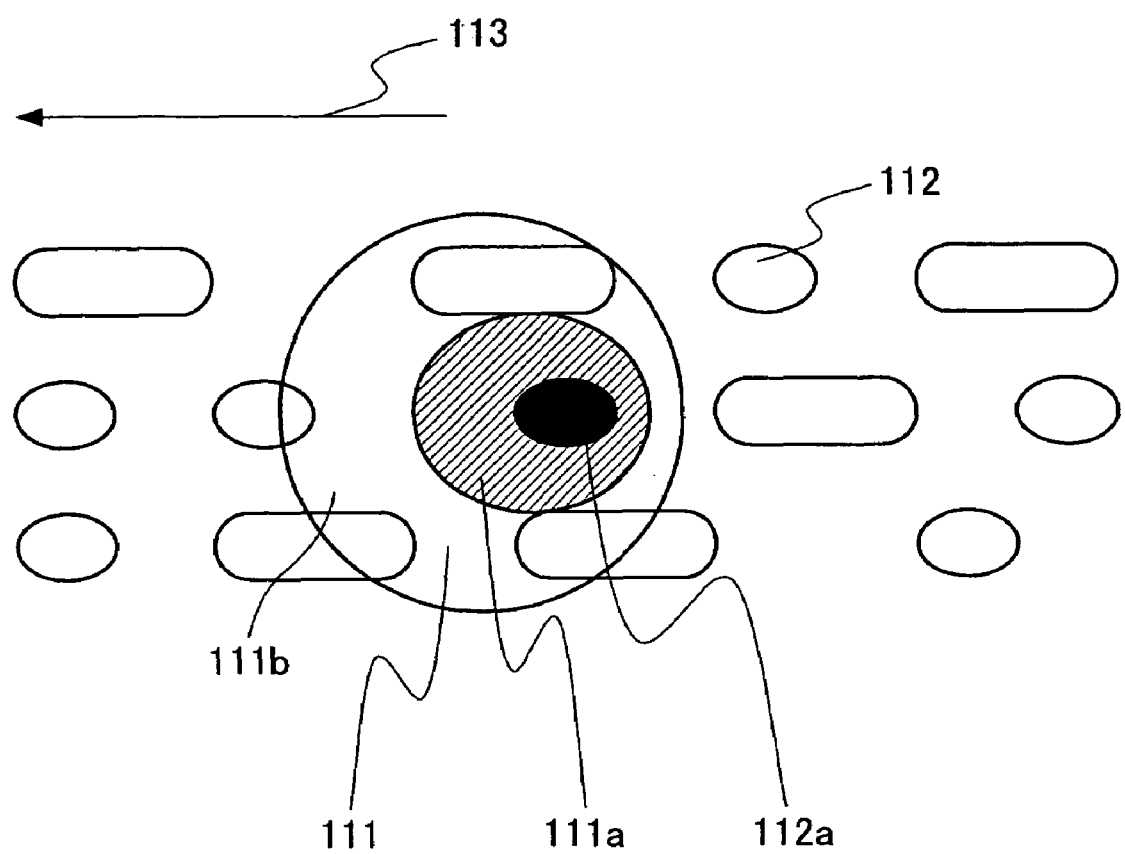
FIG. 21 is a schematic drawing showing effective reproduction spot reduction based on super-resolution medium technology.

FIG. 20 illustrates the structure of a typical optical system in which an optical disk is adopted as the optical information recording medium, the optical system being mounted, as an optical head, to the recording/reproduction device. The optical system includes a semiconductor laser 21, collimating lens 22, beam-shaping prism 23, beam splitter 24, objective lens 25, and detecting optical system 27.

The laser light emitted from the semiconductor laser 21 which is the light source is converted to a substantially parallel beam by the collimate lens 22, and by the beam-shaping prism 23, the distribution of the light intensity of this substantially parallel beam is shaped into a near-circle. This near-circular-shaped parallel beam passes through the beam splitter 24, and then collected to the optical information recording medium 26 by the objective lens 25. The light reflected on the optical information recording medium 26 is split by the beam splitter 24, and then guided to the detecting optical system 27.

A spindle motor 28 causes the optical information recording medium 26 to rotate, thereby causing the optical spot to scan the surface of the optical information recording medium 26. The detecting optical system 27 reads a recording mark provided on the optical information recording medium 26, by identifying signals on the basis of the change of the direction of polarization of the reflected light, the change of the reflected light intensity and the like. The detecting optical system 27 also detects signals indicating the out-of-focus and track displacement of the optical spot with respect to the optical recording medium, and by feeding these signals back to the drive system of the objective lens 25, corrects the displacement of the optical spot. The numerical aperture (NA) of the objective lens is, for instance, set to 0.65.

It is preferable that such an optical information recording/reproduction device can record/reproduce information to/from both an optical information recording medium of the present invention, which employs the super-resolution medium technology, and a typical optical information recording medium which does not employ the super-resolution medium technology, as the optical information recording medium 26. To achieve this, the foregoing optical information recording/reproduction device can switch the gain of the detector, the reproduction light intensity, the recording light intensity, the recording waveform, and the number of revolutions of the optical information recording medium, and the like, in order to support both the optical information recording medium of the present invention and typical optical information recording media. It is noted that, since these factors can be electrically controlled, no significant modifications in the optical system are required for the foregoing optical information recording/reproduction device, compared to a device which can record/reproduce information only from/to typical media.

Next, the following will discuss the optical information recording medium of the present invention, which employs the super-resolution medium technology.

Figure 1:
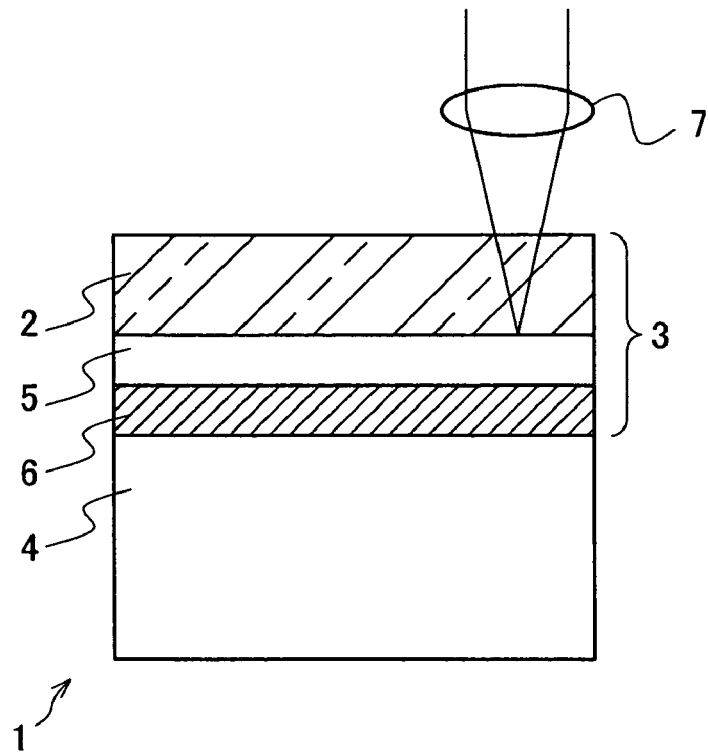
FIG. 1 is a cross section outlining the structure of an optical information recording medium which adopts a complex refractive index changing film and exerts a medium super-resolution effect.

FIG. 1 is a cross section outlining the optical information recording medium, indicating the concept of the present invention. The optical information recording medium 1 is arranged such that a thin film section 3 made up of one or more thin film(s) is provided on a substrate 4. Except in special circumstances such as a below-mentioned case, the thin film section 3 is a film stack in which a plurality of thin films are deposited. For this reason, the thin film section 3 is hereinafter termed "film stack 3".

The film stack 3 includes at least one complex refractive index changing film (optical multiple interference film) 2 whose complex refractive index changes in accordance with the incident light intensity and which excels in optical transmittance. Each of the incident-light surface of the complex refractive index changing film 2 and the other surface of the complex refractive index changing film 2 forms an interface with at least one of a thin film section, a substrate, and an airspace each having a refractive index different from that of the refractive index changing film 2. The incident light is repeatedly reflected on these interfaces formed with the above-mentioned members each having a refractive index different from that of the complex refractive index changing film 2. As a result, optical multiple interference occurs. Thus, in the film stack 3, the change of the complex refractive index of the complex refractive index changing film 2 results in the change of the state of multiple optical interference on the film stack 3, so that the reflectance of the film stack 3 is changed.

According to this arrangement, when a light beam is irradiated to the optical information recording medium 1, the complex refractive index is changed in a part of the complex refractive index changing film 2, that part being in the optical spot and having incident light intensity exceeding a threshold value of the complex refractive index changing film 2. With this change of the complex refractive index, the state of multiple optical interference in the film stack 3 is changed, so that the reflectance of the film stack 3 is changed.

In this manner, the reflectance of a part in the optical spot is changed in accordance with the incident light intensity, making it possible to enhance the reading of a recording bit which is in the optical spot and smaller in area than the optical spot. This ensures the reduction of an effective optical spot size so that the super-resolution reproduction is realized. As a result, the recording density is increased.

Note that, the above-mentioned complex refractive index may be directly changed by the incident light, or may be changed by changing the temperature of the complex refractive index changing film 2 in accordance with intensity of incident light, the change of the temperature being triggered by the conversion from the incident light to heat.

When the complex refractive index changing film 2 is a temperature-sensitive film whose complex refractive index changes in accordance with the change of temperature, it is possible to change the optical multiple interference of the film stack 3 by changing a temperature of the optical spot in the film stack 3, in accordance with the incident light intensity. This provides a wider range of options for the complex refractive index changing film 2. Furthermore, since the reflectance can be controlled by changing the temperature of the film stack 3 so as to control the optical multiple interference of the film stack 3, the design of the film stack 3 is simplified.

In the complex refractive index changing film 2, a matter of the most importance is high transparency, in order to ensure the effect of the optical multiple interference. Adopting a highly-transparent complex refractive index changing film 2, the following effect is acquired: light absorption occurring in the course of repeating multiple reflection in the complex refractive index changing film is restrained, so that light is multiple-reflected in the complex refractive index changing film over and over again. As a result, the effect of the optical multiple interference is enhanced. For this reason, even if the change of the complex refractive index in accordance with the incident light intensity is small, it is possible to magnify the change of the reflectance in the film stack (thin film section) 3.

That is to say, in the course of repeating multiple reflection in the complex refractive index changing film, light beams interfere with each other because of the phase differences due to the difference of light paths (i.e. light beams with an identical phase enhance each other while light beams with phases being different for a half wavelength cancel out each other and thus weaken each other). As a result, the reflectance changes. The higher the transparency is, the more the effect (enhancement or reduction) of the optical multiple interference is strengthened, because a quantity of light repeatedly multiple-reflected in the complex refractive index changing film increases. For this reason, the change of the reflectance increases when a film with high transparency is adopted, even if in this film the change of the complex refractive index is identical or smaller than those of other options.

With such high transparency, the complex refractive index changing film 2 is allowed to be thicker, so as to increase the difference between the light paths of the light beams repeatedly multiple-reflecting in the complex refractive index changing film. For this reason, as the phase difference is increased, even if the change of the complex refractive index in accordance with the incident light intensity is small, the effect of the optical multiple interference is enhanced so that the change of the reflectance of the thin film section is increased. In this manner, the change of the reflectance is increased by the optical multiple interference, and hence the effective optical spot size is reduced in a more effective manner.

When the complex refractive index changing film 2 is a temperature-sensitive film, a highly transparent complex refractive index changing film which can sufficiently achieve the effect of the optical multiple interference is realized on condition that an extinction coefficient k of the complex index is not more than 0.2 at room temperatures.

As such a temperature-sensitive film which is highly transparent and utilizes heat, it is possible to adopt a thin film made of a combination of more than one element, i.e. a thin film made of any one of oxide, nitride, sulfide, fluoride, and carbide, or a thin film made of a mixture or compound made of the foregoing substances. In particular, a temperature-sensitive film made of any one of oxide, nitride, sulfide, fluoride, and carbide each made up of at least 3 elements can endure a high temperature on the occasion of the recording and can be read for a great number of times.

To be more precise, any one of an oxide thin film including Zn, a sulfide thin film including Zn, an oxide thin film including Ce, and an oxide thin film including Sn can be adopted. More specifically, a ZnO thin film, a ZnS thin film, a $CeO_2$ thin film, or a $SnO_2$ thin film can be adopted. Note that, in the field of optical information recording media, ZnS is typically mixed with $SiO_2$ and used as a $ZnS—SiO_2$ transparent film, in consideration of the strength, toughness, and affinity with neighboring members.

In the present arrangement where the change of reflectance is caused by the change of the structure of optical multiple interference, the super-resolution reproduction is realized by an optical information recording medium with properly chosen materials, without making any significant modifications to conventional reproduction devices and recording/reproduction devices. For this reason, the optical information recording medium is compatible with conventional optical disks.

The foregoing optical information recording medium 1 is arranged in such a manner that the reflectance on the film stack 3 influenced by the optical multiple interference rapidly changes when the incident light intensity is not less than a predetermined value. According to this arrangement, since the reflectance on the film stack 3 utilizing the optical multiple interference rapidly changes when the incident light intensity increases to be not less than a predetermined value, an intermediary transition area which is the border between a masked area and a reproduction area in the optical spot can be made narrower than that of an arrangement in which the reflectance smoothly changes in accordance with the incident light intensity. Thus, it is possible to read a recording bit in the reproduction area with further enhancement, so that the noise is reduced and the quality of signals is improved.

The optical information recording medium 1 has such an antireflection structure that the reflectance in the film stack 3 influenced by the optical multiple interference, in the state of no change in the complex refractive index of the complex refractive index film 2, is minimum or substantially minimum in the vicinity of the wavelength of the incident light, i.e. the reflectance at room temperatures is minimum or substantially minimum in the vicinity of the wavelength of the incident light. With this, the antireflection structure in an area within the optical spot is cancelled out by the incident light applied thereto, so that the reading of pits in the area are emphasized. As a result, an effective optical spot size is reduced and the super-resolution reproduction is realized.

In the film stack 3, the reflectance influenced by the optical multiple interference is basically arranged as above. The film stack 3 may further include, as thin films 5 and 6 other than the complex refractive index changing film 2, a reflective film for improving overall efficiency of the use of light in the film stack 3, various auxiliary functional films for facilitating the change of the complex refractive index of the complex refractive index changing film 2 in accordance with the light intensity, and so forth.

Even though FIG. 1 shows that the film stack 3 is made up of three thin films, the film stack 3 may be made up solely of the complex refractive index changing film 2, or may include an arbitrary number of thin films in addition to the complex refractive index changing film 2.

The reflective film is provided for improving overall efficiency of the use of light in the film stack 3, by reflecting the light beam having passed through the temperature-sensitive film and auxiliary functional film and causing the light beam to go back to the temperature-sensitive film and auxiliary functional film again. Such a reflective film is any one of: an Al film; an Ag film; an Au film; a film made of an alloy of Al, Ag, or Au; a film made of an alloy of Al, Ag, or Au, to which another type of metal is added; and a film made of another type of metal or an alloy thereof. Considering the objective of the present invention, the reflectance of the thin film is preferably high.

When the complex refractive index changing film 2 is a temperature-sensitive film which converts light to heat and whose complex refractive index changes in accordance with the temperature change, examples of the above-mentioned auxiliary functional films include a light-absorbing film facilitating the temperature rise of the temperature-sensitive film, a heat insulation film which prevents the heat of the light-absorbing film from diffusing to thin films other than the temperature-sensitive film, and so forth.

The light-absorbing film is provided for increasing the temperature of the temperature-sensitive film by absorbing light so as to heating itself. Being transparent (or substantially transparent) and excelling in optical transmittance as described above, the temperature-sensitive film cannot easily increase the temperature thereof by absorbing light. For this reason, the light-absorbing film is preferably provided for increasing the temperature. Examples of such a light-absorbing film are semiconductors or semimetal films such as an Si film and a Ge film, a phase-conversion medium film, and a magneto-optical recording film. The light-absorbing film is required to absorb light to a certain degree and increase its temperature with the application of a light beam, but reflectance is not particularly specified.

As one of the auxiliary functional film, a protective film for protecting the light-absorbing film may be provided. Since the light-absorbing film increases its temperature by absorbing light, the temperature of the light-absorbing film is liable to be high. If such a light-absorbing film is formed directly on the substrate, the destruction, degradation, or oxidation of the light-absorbing film may occur. To prevent this, it is preferable that a protective film for protecting the light-absorbing film is provided.

Note that, the protective film is provided, for instance, between the substrate and the light-absorbing film or between the reflective film and the light-absorbing film. In other words, to protect the light-absorbing film, it is preferable that the protective film is provided so as to be adjacent to the light-absorbing film.

The protective film thus provided can prevent the oxidation and deformation of the light-absorbing film, and also protects the substrate from, for instance, deformation due to the temperature rise caused by heat conduction.

When the optical information recording medium 1 has a recording layer for recording information, this recording layer is formed as a part of the film stack 3. It is unnecessary to do so when the optical information medium 1 records information in the form of irregularities formed on the substrate 4. As the recording layer, it is possible to adopt a write-once recording film, a magneto-optical recording film, a phase conversion recording film, and the like.

In particular, when the film stack 3 includes the aforementioned recording film (recording layer), the recording film may perform as the light-absorbing film, because, in some cases, the recording film absorbs light on the occasion of the reproduction so that the temperature thereof increases. In such cases, it is unnecessary to additionally provide the light-absorbing film for increasing the temperature of the temperature-sensitive film. For this reason, the objective of the present invention is achieved by the minimum arrangement, i.e. the temperature-sensitive film and the recording film. When the recording layer is provided, the film stack 3 may include a protective film for protecting the recording layer.

When the recording layer is included as one of the films of the film stack 3, the films constituting the film stack 3 are made of inorganic materials, except the recording layer and a resin layer. With this, the destruction by heat hardly occurs, so that information reproduction or information recording/reproduction can be carried out for a great number of times.

The above-mentioned case that the film stack 3 is a single film is such a case that information is recorded in advance in the form of irregularities on the substrate 4, and as the thin film section, only the complex refractive index changing film 2 is provided on the substrate 4.

More than one film stack 3 may be deposited on the substrate 4. In such a case that the film stacks 3 each being able to change the reflectance in accordance with the incident light intensity are deposited, a multi-layered recording section structure in which a plurality of recording layers or a plurality of recording surfaces each recording information in the form of irregularities is realized without changing the size of the optical information recording medium, so that the storage capacity is increased.

In this case, the distance between the neighboring film stacks 3 is preferably within the range between 2 µm and 20 µm. Forming the distance in this way makes it easy to realize the multi-layered recording section structure, improves the accuracy, and increases the manufacturing efficiency. The distance is more preferably within the range between 10 µm and 20 µm.

FIG. 1 shows that, in the optical information recording medium 1, the film stack 3 is provided on the incident-light side of the substrate 4, and the light beam is irradiated from the film stack 3 side. However, the light may incident to the film stack 3 from the substrate 4 side.

According to the former arrangement, since the film stack 3 is provided on the incident-light side of the substrate 4, it is possible to reduce, for instance, the aberration caused by the tilt or birefringence of the substrate 4, so that high density is easily realized compared to the latter arrangement.

According to the latter arrangement, on the other hand, since the substrate 4 is provided on the incident-light side of the film stack 3, the film stack 3 is protected and read errors hardly occur even if the substrate 4 is damaged.

The substrate 4 is required in the first place to impart sufficient strength to the optical information recording medium 1. Thus, when the light beam is irradiated from the film stack 3 side, there are no particular limits to optical characteristics and transparency of the substrate 4. However, when the light beam is irradiated from the substrate side, the transparency of the substrate 4 is preferably as high as possible.

The substrate 4 is made of: polycarbonate; glass; amorphous polyolefin; thermoplastic polyimide; thermoplastic transparent resin such as PET (polyethylene terephthalate), PEN (polyethylenenaphthalate), and PES (polyether sulphone); thermosetting transparent resin such as thermosetting polyimide and ultraviolet curing acrylic resin; metal; and the like, or a combination of these materials.

When the light comes from the film stack 3 side and the complex refractive index changing film 2 is a temperature-sensitive film, the temperature-sensitive film is provided in such a manner that the incident light primarily enters the temperature-sensitive film when passing through the film stack 3. With this, since the temperature-sensitive film is exposed to air, the air serves as an insulating material, so that the temperature-sensitive film can keep the heat in and thus the temperature of the temperature-sensitive film is effectively changed.

Referring to examples, the following will discuss the optical information recording medium of the present invention in more detail.

EXAMPLE 1

Figure 2:
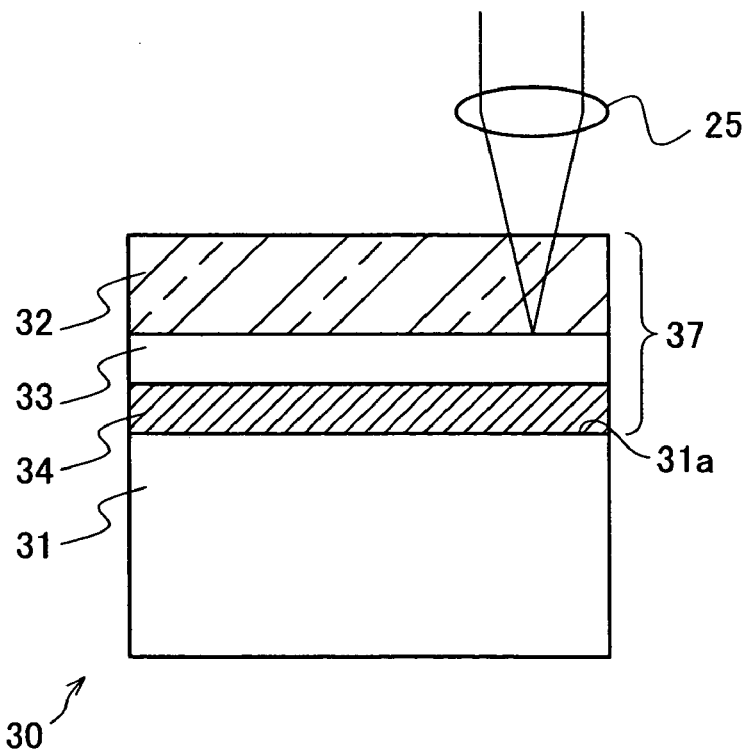
FIG. 2 is a cross section showing the structure of the optical information recording medium of Example 1 of the present invention, which exerts the medium super-resolution effect.

FIG. 2 is a cross section of an optical information recording medium 30 of Example 1 which is one of the examples of the present invention. This optical information recording medium 30 is a playback-only type. A substrate 31 is a polycarbonate substrate 12 cm in diameter and 1.1 mm thick. On one surface 31a of the substrate 31, information is recorded in advance in the form of phase pits. This surface 31a is the recording surface.

Next, on the surface 31a of the substrate 31, an Al film 30 nm thick is formed as a reflective film 34, by a magnetron sputtering method. On this reflective film 34, a Si film 50 nm thick is formed as a light-absorbing film 33, and a ZnO film 220 nm thick as a temperature-sensitive film 32 is further formed thereon. In this manner, a film stack (thin film section) 37 made up of, from the incident-light side, the temperature-sensitive film 32, the light-absorbing film 33, and the reflective film 34 is formed on the substrate 31.

As described above, the present invention utilizes optical multiple interference in a film stack (film stack 37 in the present example) including a complex refractive index changing film (temperature-sensitive film 32 in the present example) which is a super-resolution film. On this account, the complex refractive indices and the thicknesses of the temperature-sensitive film 32, the light-absorbing film 33, and the reflective film 34 constituting the film stack 37 have to be carefully determined. The complex refractive indices and the thicknesses are determined in the following manner.

The optical characteristics of these films were measured one by one using an ellipsometer. after increasing the temperature from a room temperature (30° C.) to 200° C., the complex refractive index (=n−ki where i is an imaginary number) of the ZnO film which is the temperature-sensitive film changed from n (refractive index)=2.16 and k (extinction coefficient)=0.00 at the room temperature to n=2.32 and k=0.07 at 200° C. Meanwhile, the complex refractive index of the Si film which is the light-absorbing film 33 was n=4.66 and k=1.67 both at the room temperature and 200° C., thus did not change in accordance with the temperature change. Similarly, the complex refractive index of the Al film which is the reflective film 34 is n=0.41 and k=4.06 both at the room temperature and 200° C., thus did not change in accordance with the temperature change.

Figure 3:
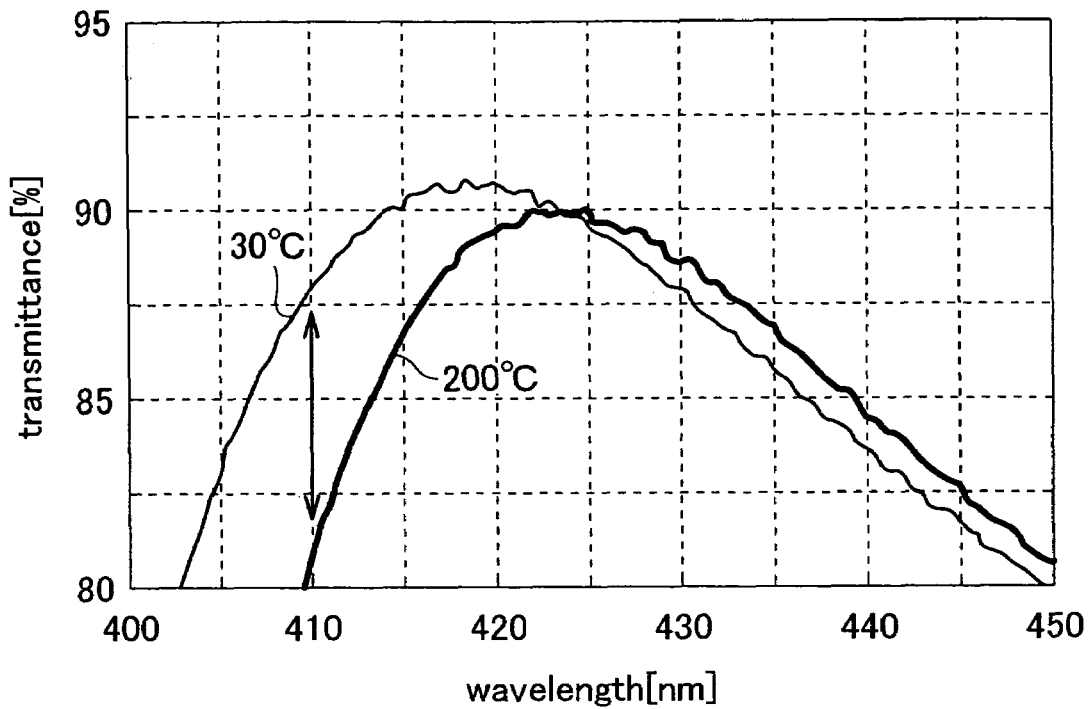
FIG. 3 illustrates the spectrum of a single ZnO film which is a complex refractive index changing film, the spectrum indicating the relationship between a transmittance and an wavelength.

FIG. 3 shows how the reflectance of the ZnO (single) film depends on the wavelength of the incident light at 30° C. and 200° C. From this figure, one can understand that the complex refractive index changes and the reflectance spectrum shifts with respect to the measured wavelength, in accordance with the temperature change. Focusing on a particular wavelength, it is found that the complex refractive index which induces the optical multiple interference of the ZnO (single) film changes, so that the transmittance changes. In this ZnO film, as specifically shown by an arrow in the figure, the transmittance greatly changes due to the temperature change, around the wavelength of 410 nm. This change of the transmittance occurs due to the change of the complex refractive index which induces the optical multiple interference of the ZnO (single) film. As with many types of optical information recording media, the initial transmittance before the change can be adjusted to some degree, by changing the degree of multiple interference by changing the thickness of the ZnO film. This indicates that the change of the transmittance at a desired wavelength can be controlled by changing the thickness of the ZnO film constituting the temperature-sensitive film 32.

Controlling the thickness of the temperature-sensitive film 32 is equivalent to the adjustment of the length of the light path of the incident light in the temperature-sensitive film 32. Furthermore, since the light path length is figured out by multiplying the thickness of the film by the reflectance, it is possible to acquire an effect identical with the above, by adjusting the refractive index in the temperature-sensitive film 32. Examples of the methods for adjusting the refractive index of the temperature-sensitive film 32 include the adjustment of the composition of materials of the temperature-sensitive film 32, the adjustment of sputtering conditions on the occasion of forming the temperature-sensitive film 32, and so on.

It has been confirmed that the change of the refractive index of the ZnO film, i.e. the change of the transmittance in accordance with the temperature change is reversible. Thus, the characteristics of the ZnO film do not deteriorate even if the temperature is changed many times, and the change of the transmittance always changes in accordance with the temperature change at equal rate.

In the optical information recording medium 30 of Example 1, a light beam enters thereto from the temperature-sensitive film 32 side. Thus, the temperature-sensitive film 32, the light-absorbing film 33, and the reflective film 34 are provided in this order from the incident-light side, so that that light passes through the films 32, 33, and 34 in this order.

Figure 4:
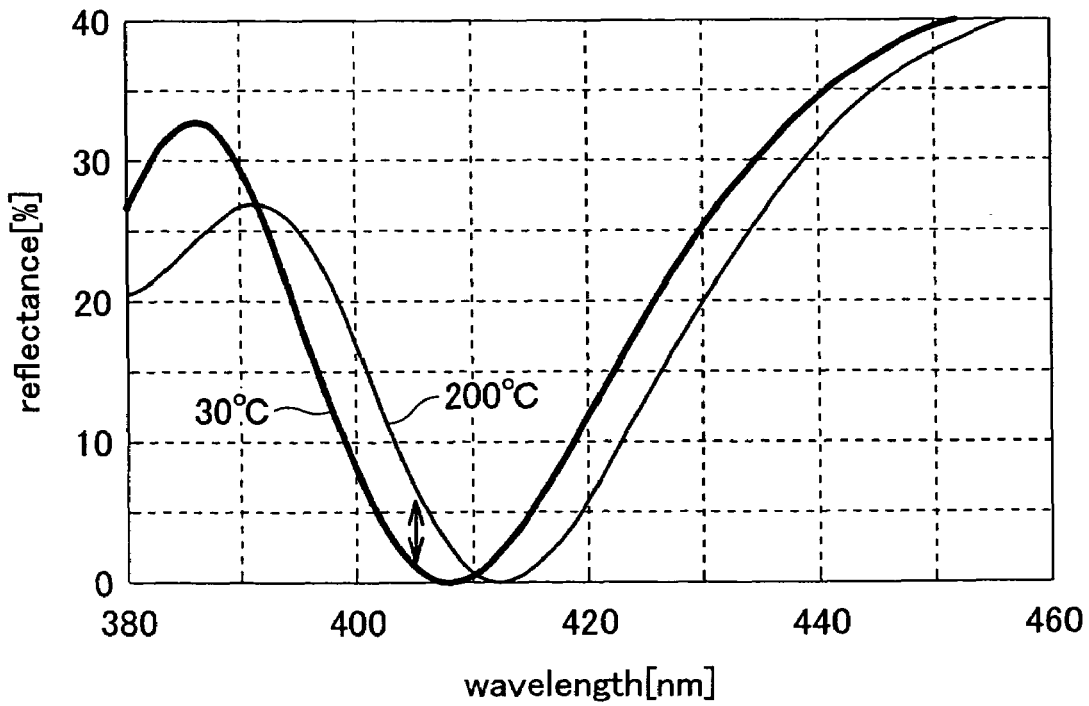
FIG. 4 illustrates the spectrum of the optical information recording medium of Example 1, the relationship between reflectance and an wavelength.

FIG. 4 shows how the reflectance of the optical information recording medium 30 of Example 1 changes depending on the wavelength of the incident light at 30° C. and 200° C. As the figure shows, with respect to the wavelength, the reflectance of the optical information recording medium 30 changes in a wavelike manner. It is considered that such a wavelike change occurs due to the optical multiple interference in the film stack 37 caused by the light passing through the ZnO film constituting the temperature-sensitive film 32.

In the optical information recording medium 30 of Example 1 the complex refractive indices and the thicknesses of the films 32, 33, and 34 constituting the film stack 37 are arranged in such a manner as to cause the optical multiple interference of the film stack 37 to be at the bottom (i.e. reflectance is substantially 0) at 30° C. (room temperature) when the wavelength of the light of the recording/reproduction device is about 405 nm and the complex refractive index of the temperature-sensitive film 32 does not change. In short, the complex refractive indices and the thicknesses of the films 32, 33, and 34 are arranged in such a manner as to cause the film stack 37 to have the antireflection structure.

When the temperature increases from the room temperature to 200° C., the reflectance spectrum is shifted to the long-wavelength side. In this case, the bottom of the interference is drifted from the reproduction wavelength of 405 nm, so that the reflectance is higher than the above.

For this reason, it is possible to consider as follows: The complex refractive index of the ZnO film constituting the temperature-sensitive film 32 changes in accordance with the temperature change, and the change of the complex refractive index causes the degree of the optical multiple interference of the film stack 37 to change. As a result, the film stack 37 becomes no longer antireflective and hence the reflectance increases. As in the case of the transmittance of the ZnO film, it has been confirmed that the transmittance of the film stack 37 in accordance with the temperature change is reversible. Thus, the characteristics of the film stack 37 do not deteriorate even if the temperature is changed many times, and the change of the transmittance always changes in accordance with the temperature changes in an identical manner.

It is noted that the evaluation of the reproduction of the optical information recording medium is carried out under the following conditions.

1. A disk evaluation device is used.
2. Light is converged (to be not more than 1 µm in diameter) using a lens.
3. The intensity of the light is controlled (in order to control the temperature).
4. In consequence of the above, the temperature of the medium at the focal point is increased to a proper value.

Meanwhile, the wavelength dependency of the refractive index is measured under the following conditions.

1. A spectrophotometer is used.
2. To the optical information recording medium, parallel light having constant intensity is applied (the diameter of the light is on the order of a few millimeters).
3. Since the application of the parallel light does not increase the temperature of the medium, the wavelength dependency of the reflectance is measured at room temperatures, and then the wavelength dependency of the refractive index is measured again after increasing the temperature using a heater.

As described above, the light for evaluating the reproduction is different in characteristics from the light for measuring the wavelength dependency. This is because, on the occasion of measuring the wavelength dependency, the incident light (converged using a lens) for the reproduction increases the temperature, so that the distribution of the reflectance to wavelengths (hereinafter, this distribution of the reflectance to the wavelength will be at times referred to as wavelength distribution), at a constant temperature cannot be measured.

Meanwhile, on the occasion of the reproduction, it is necessary to increase the temperature of the medium by the reproduction light and change the characteristics (refractive index) of the temperature-sensitive film.

After all, the wavelength dependency of the reflectance has to be measured at a constant temperature so as to be measured using parallel light which does not increase the temperature. The wavelength dependency is again measured after increasing the temperature using a heater. By doing so, it is confirmed that the reflectance at room temperatures is different from the reflectance at a high temperature. On the occasion of the actual reproduction, meanwhile, the light is converged using a lens, so that the temperature of a part of the medium is increased to be around the high temperature, concurrently with the reproduction. As a result, the refractive index is changed only in the part of the medium, making it possible to read a pit smaller than the diameter of the converged light.

Furthermore, it is advantageous to the frequent temperature change that the temperature-sensitive film 32, the light-absorbing film 33, and the reflective film 34 constituting the film stack 37 are all made of inorganic materials. When the temperature-sensitive film 32 is made of an organic material, the molecular structure thereof changes when light is absorbed so that optical characteristics are changed. For this reason, such a film cannot endure frequent recording and reproduction and the responsiveness thereof is bad, so that the organic film has problems in the durability and the quality of reproduction. On the other hand, in general, the inorganic film can realize the change of the optical characteristics only with the change of the electronic state, and no significant changes in molecular structure are involved. For this reason, the inorganic film excels in durability.

With regard to the optical multiple interference in Example 1, since only the temperature-sensitive film 32 is substantially transparent (i.e. the extinction coefficient k is almost 0), the repeating reflections causing the optical multiple interference occur in the temperature-sensitive film 32. More specifically, the light is repeatedly reflected on the both surfaces of the temperature-sensitive film 32, i.e. at the interface between the temperature-sensitive film 32 and air and the interface between the temperature-sensitive film 32 and the light-absorbing film 33. In reality, the reflections at the interfaces between films other than the above do not influence on the optical multiple interference so much. For this reason, it is possible to freely determine the optical multiple interference in the thin film section (film stack 37) by arbitrarily adjusting the thickness and complex refractive index of the temperature-sensitive film 32, with the other conditions being unchanged.

This makes it easier to design and manufacture the medium, and also lowers the manufacturing costs. Moreover, since the repeating reflections predominantly occur in the temperature-sensitive film 32, the light absorption in the temperature-sensitive film 32 effectively occurs. Also, comparing to the case that a transparent film contributing to the repeating reflections is provided in addition to the temperature-sensitive film 32, the present arrangement makes it possible to increase the thickness of the temperature-sensitive film 32, thereby increasing the degree of the reflectance change in the thin film section. Furthermore, when the transparent film contributing to the repeating reflections is provided, heat for heating the temperature-sensitive film 32 is diffused to the transparent film and thus wasted.

Now, we enter into further details of the method of adjusting the thicknesses of the temperature-sensitive film 32 and the light-absorbing film 33. The thicknesses of the temperature-sensitive film 32 and the light-absorbing film 33 are determined in consideration of the following three points.

The incident light passes through the temperature-sensitive film 32 and is absorbed by the light-absorbing film 33.

By the heat generated by the light absorption in the light-absorbing film 33, the temperature of the temperature-sensitive film 32 is increased.

Due to the temperature rise, the complex refractive index of the temperature-sensitive film 32 is changed, the state of the optical multiple interference in the film stack 37 is changed, and as a result the reflectance of the film stack 37 influenced by the optical multiple interference is changed.

Figure 5:
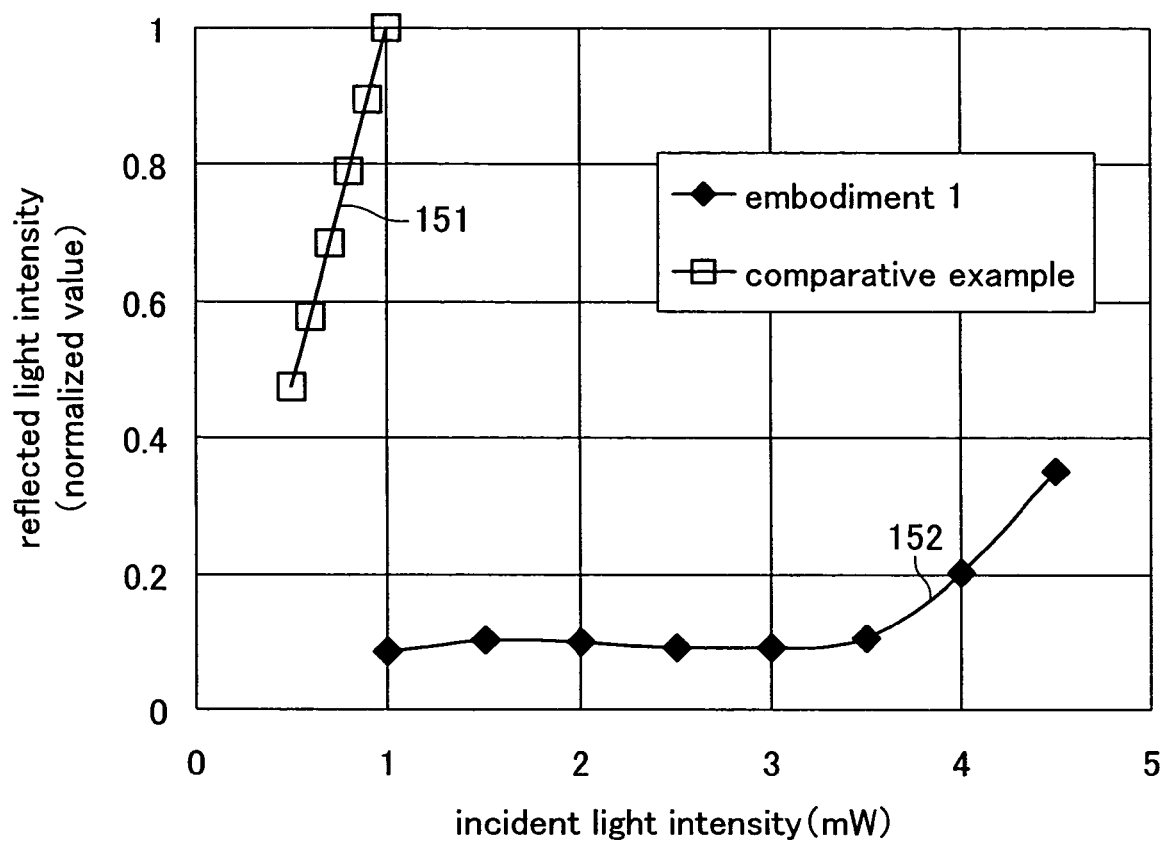
FIG. 5 illustrates how reflected light intensity (standard value) changes with respect to incident light intensity in the medium of Example 1.

FIG. 5 shows the result of measurement of reflected light intensity by a measuring device. This reflected light intensity is the intensity of incident light reflected on a mirror part (flat part where no irregularities and grooves are formed) of the optical information recording medium 30 of Example 1. In addition to this, FIG. 5 also shows the result of measurement of reflected light intensity in an optical information recording medium of a comparative example, in which only an Al film which is 30 nm thick is formed on a substrate 31. Note that, the reflected light intensity is determined on the supposition that the reflected light intensity in the optical information recording medium of the comparative example, when the incident light intensity is 1 mW, is 1.

The result 151 (indicated by □) of the optical information recording medium of the comparative example shows that the incident light intensity is in proportion to the reflected light intensity. This indicates that the reflectance does not change even if the incident light intensity increases. Meanwhile, the result 152 (indicated by ♦) of the optical information recording medium 30 of Example 1 shows that the incident light intensity is not in proportion to the reflected light intensity. When the incident light intensity is low, the reflected light intensity is more or less constant at a low level. After the incident light intensity exceeds a predetermined value, the reflectance increases and the reflected light intensity increases. The rate of change of the reflectance after the incident light intensity exceeds a predetermined value, which is represented as {R (after the change)−R (before the change)}/R (before the change), is not less than 2 and nearly 3.

Figure 6:
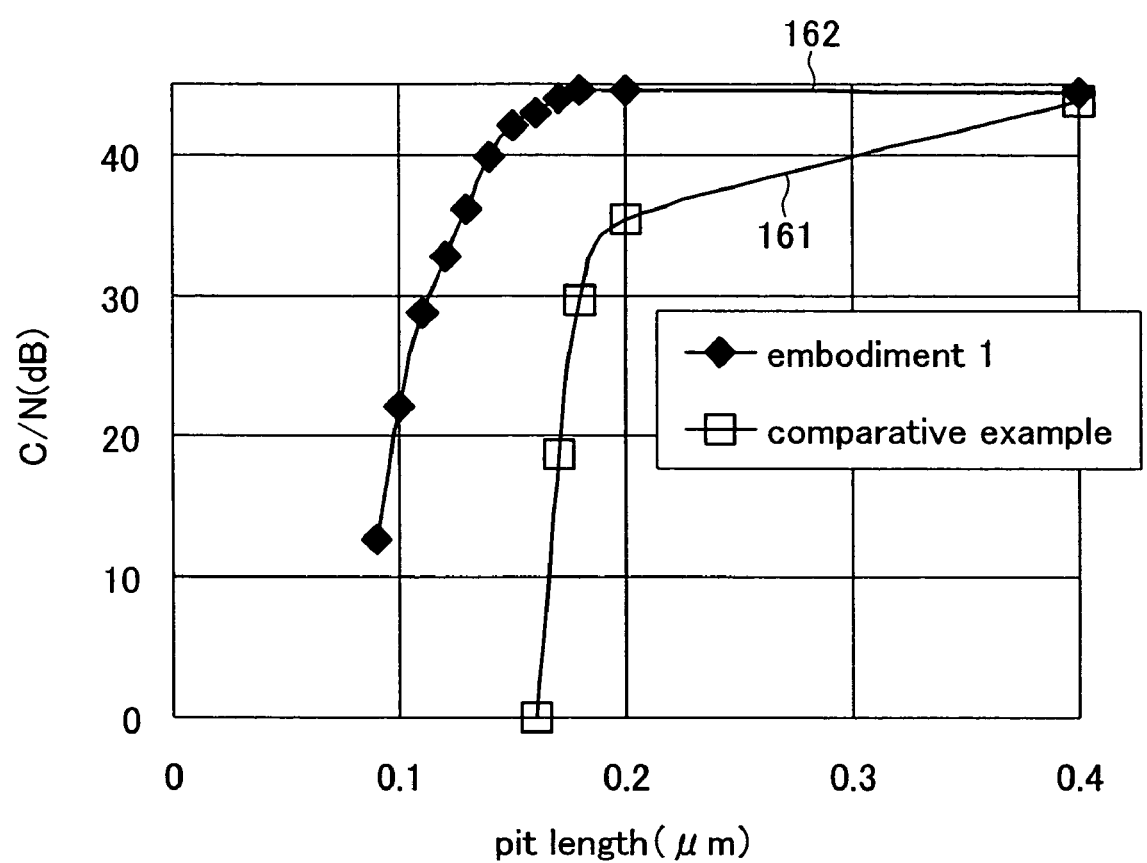
FIG. 6 illustrates how a signal-noise ratio (C/N) changes with respect to a pit length of the medium of Example 1.

FIG. 6 shows the results of measurements of carrier-to-noise ratios (hereinafter, C/N) of reproduction signals of the optical information recording medium 30 of Example 1 and the optical information recording medium of the comparative example in which only the Al film is formed. In the measurements, recording marks are single-frequency repeating phase pits (mark/space ratio is 1 to 1), and the signal amplitude is standardized in accordance with a reflected light level. The phase pits are physical irregularities on the substrate 31 and about 80 nm in depth. The measurements were done using an optical disk evaluation device with an wavelength of 405 nm and an objective lens of NA 0.65. The measuring conditions were a linear velocity of 1.8 m/s, a reproduction power of 4.0 mW, and a spectrum analyzer of RBW 30 kHz.

In the result 161 of the optical information recording medium 161 of the comparative example, the C/N falls to about 0 at the mark length of 0.16 μm which is close to optical cutoff (mark length of 0.157 μm). On the other hand, in the result 162 of the optical information recording medium 30 of Example 1, the C/N exceeds 40 dB at the mark length of 0.16 μm.

To meet the C/N of 40 dB which is thought as a practical signal level, the minimum mark length is 0.30 μm in the case of the optical information recording medium of the comparative example, while the minimum mark length is 0.14 μm in the case of the optical information recording medium 30 of Example 1. This indicates that the optical information recording medium can read a mark which is half as much as the minimum mark length in the case of the optical information recording medium of the comparative example.

Furthermore, in the measured range, the C/N ratio of the optical information recording medium 30 of Example 1 is always not less than the C/N ratio of the optical information recording medium of the comparative example. This indicates that the optical information recording medium 30 of Example 1 is better in signal quality than the optical information recording medium of the comparative example.

Thus, with doubled line density, i.e. doubled recording surface density, the recording density is quadrupled compared to a conventional optical information recording medium. Furthermore, an endurance test carried out by repeatedly playing the optical information recording medium 30 proved that the degradation of signal quality does not occur even after repeating the reproduction for hundred thousand times.

This result does not contradict the reflectance of the film stack 37 measured with the overall temperature change of the film. That is to say, the ZnO film constituting the temperature-sensitive film 32 has such a characteristic that the complex refractive index changes with the application of a light beam whose intensity exceeds a certain threshold value. With the formation of an optical spot, the complex refractive index of an area of the temperature-sensitive film 32 changes, the area having a high temperature. As a result of the optical multiple interference in the film stack 37, the reflectance in the foregoing area increases, so that only a recording mark in a high-reflectance area is read. The reproduction resolution of a recording mark formed on the substrate 31 is determined by the size of an area of the temperature-sensitive film 32, in the area the complex refractive index being changed and an optical spot being formed. That is to say, a signal in a part of an optical spot is enhanced and read, so that the size of a spot effectively contributing to the reproduction can be reduced and hence a high-density recording medium can be realized. As described above, this is the medium super-resolution effect.

Furthermore, since the transmittance of the ZnO single film and the reflectance of the optical information recording medium 30 of Example 1 are reversible with respect to the temperature changes, the medium super-resolution effect lasts with no degradation, so that the endurance is acquired.

To design the optical information recording medium 30 of Example 1 in FIG. 2 in such a manner as to increase the reflectance, the temperature-sensitive film 32 is made of a material with which the complex refractive index (=n−ki where i is an imaginary number) of the temperature-sensitive film 32 satisfies the followings: As a refractive index n (before change)=2.2±0.7 and $0 \leq k$ (before change)$\leq 0.2$, the refractive index n is arranged such that the difference between n (after change) and n (before change) is not less than the absolute value of 0.02 (the larger n is, the better). That is, the refractive index n changes in accordance with the formula: |n (after change)−n(before change)|>0.02.

Meanwhile, as to the extinction coefficient k, since it is preferable in the present invention that the temperature-sensitive film 32 excels in transparency in order to exploit the optical multiple interference in the film stack 37, the extinction coefficient k is preferably about 0. More preferably, $0 \leq k$ (after change)$\leq k$ (before change) in order to increase the transmittance after the change. However, it is noted that the extinction coefficient k does not necessarily change as above, because the change of n has a greater impact on the optical multiple interference than the change of k. For this reason, the extinction coefficient k may be a constant value.

As described above, in Example 1, the refractive index n increases in response to the temperature rise, and as a result the reflectance in the thin film section increases. To facilitate the increase of the reflectance in the thin film section, it is preferable that the extinction coefficient k decreases as the temperature increases, so that the transmittance of the temperature-sensitive film increases. In Example 1, the extinction coefficient k of the temperature-sensitive film increases as the temperature rises, so that the reflectance in the thin film section is small and undesirable. However, in this case the increase of the reflectance due to the change of the refractive index n is greater than the increase of the reflectance due to the change of the extinction coefficient k. For this reason, the effect of the present invention can be obtained in Example 1.

In general, the degree of the change of the complex refractive index of a temperature-sensitive film material, due to a temperature change, is determined by the type of material and manufacturing conditions. Thus, it is preferable to select optical interference conditions and materials with which the changes of n and k due to the temperature change synergistically enhance the reflectance change in the thin film section.

Regarding the transmittance of the ZnO single film shown in FIG. 3, around the wavelength of 401 nm of the incident light, the transmittance at 200° C. after the temperature rise is lower than the transmittance at 30° C. before the temperature rise. In reality, the thickness of the ZnO single film is arranged in such a manner as to reverse the relationship between these transmittances. That is to say, since the decrease of the transmittance after the temperature rise is chiefly caused by the change of the refractive index n, it is possible to arrange the transmittance to increase after the temperature rise, by adjusting the thickness of the ZnO film. Comparing two curves of the transmittances in FIG. 3, the maximum value of the transmittance at 30° C. is slightly higher than the maximum value of the transmittance at 200° C. This difference occurs by the change of k.

As already described with a formula in BACKGROUND OF THE INVENTION, the extinction coefficient k is preferably small, in order to increase the multiple interference effect by shortening the light source wavelength and increasing the thickness.

In the ZnO used in Example 1, the absorption starts when the wavelength is about 400 nm or shorter, and in accordance with sputtering conditions (more specifically, a sputtering gas pressure and an introduction ratio of argon gas to oxygen gas), an optical constant of the formed thin film at the wavelength of 400 nm can be controlled to a certain degree. More specifically, excessive supply of oxygen causes the film to be transparent (k=0), while scarcity of oxygen causes the film to be opaque (up to k=about 0.25).

Table 1 shows the result of a comparison between optical information recording media which are arranged in the same manner as that of Example 1 except the extinction coefficient k of the temperature-sensitive film. In the comparison, the reflectance is arranged so as to be minimum or substantially minimum at the light source wavelength. Note that, the rate of reflectance change is a value of the aforementioned {R (after the change)−R (before the change)}/R (before the change), while the C/N is a value at a continual pit 0.16 μm long, which is close to optical cutoff (mark length of 0.157 μm).

In the foregoing comparative example (Al; 30 nm), the C/N at the same pit length is fallen to substantially 0 (FIG. 6). This indicates that the C/N is such a low level that the super-resolution reproduction cannot be carried out.

TABLE 1

| k | 0 | 0.1 | 0.2 | 0.25 |
| --- | --- | --- | --- | --- |
| Rate of Reflectance Change | 3.1 | 2.1 | 1.6 | 1.2 |
| C/N (dB) | 42.9 | 31.1 | 19.5 | 2.2 |

According to the table, the super-resolution effect is acquired to a certain degree until the extinction coefficient k increases to be not more than 0.2. Meanwhile, when k is 0.25, the C/N is substantially 0, and this indicates that the super-resolution reproduction is not carried out as in the comparative example. Although the values of the C/N show that k=0 is the most preferable, It is considered that k≦0.2 is acceptable.

The result above is explained as below. As k increases, the light absorption in the temperature-sensitive film 32 also increases, so that the transmittance of the temperature-sensitive film 21 alone decreases and an amount of passing light decreases. Thus, the total amount of reflected light of the film stack 37 decreases, and also the reflectance change decreases because the multiple interference effect is no longer effective. As a result, the film becomes almost no different from a conventional film like the film in the conventional example, so that the super-resolution effect is no longer obtained.

The range of temperature change in FIG. 4 is between 30° C. and 200° C. However, when actually carrying out the reproduction, the reflectance quickly increases as shown in FIG. 5, so that the maximum temperature could exceed 200° C. In such a case, the wavelength of the reflectance spectrum further shifts to the long-wavelength side, so that the increase of the reflectance will be more than the increase in FIG. 4.

To increase the recording density, it is preferable to adopt, as the temperature-sensitive film 32, a ZnO film whose complex refractive index rapidly changes at a threshold temperature which is 60% through 80% of the peak temperature of the temperature distribution generated by the optical spot. With this, an area in which the reflectance change occurs is limited to the central part of the optical spot, the effective reproduction spot is further reduced, and consequently the recording density is further improved.

Such an adjustment can be realized both by adjusting the optical characteristics of the temperature-sensitive film 32 and by adjusting the interference in the film stack 37. More specifically, as shown in FIG. 4, when the wavelength is 405 nm, the reflectance at 30° C. is on the left side of the bottom of the optical multiple interference. However, the reflectance is not necessarily limited to this, and hence the reflectance may be at the bottom or on the right side of the bottom.

For instance, assume that, on occasion that the wavelength is 405 nm, the reflectance at 30° C. is on the right side of the bottom. In this case, when the bottom moves toward the right side as the temperature increases, the reflectance of the reproduction wavelength further decreases and then increases after passing through the bottom. With this, the threshold temperature at which the reflectance starts to increase is virtually increased, the effective reproduction spot is further reduced in a similar manner as above, and consequently the recording density is further improved.

In the optical information recording medium 30 of Example 1, the film stack 37 is structured in such a manner that the temperature-sensitive film 32, the light-absorbing film 33, and the reflective film 34 are deposited in this order from the incident-light side from which the light beam enters the film stack 37. However, the optical information recording medium of the present invention is not necessarily arranged in this manner. The following will thus describe another arrangement of films.

EXAMPLE 2

Figure 7:
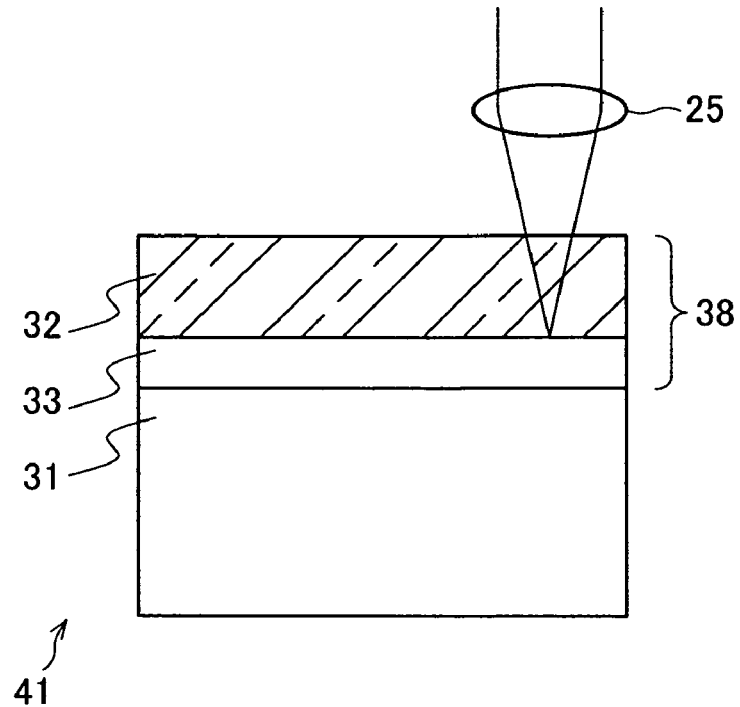
FIG. 7 is a cross section showing the structure of an optical information recording medium of Example 2 of the present invention, which exerts the medium super-resolution effect.

FIG. 7 is a cross section of an optical information recording medium 41 of Example 2, and this optical information recording medium 41 includes a two-layered film stack 38 in which a temperature-sensitive film 32 and a light-absorbing film 33 are deposited in this order from the incident-light side. Being identical with the optical information recording medium 30 of Example 1, the optical information recording medium 41 of Example 2 includes a substrate 31 made up of a polycarbonate plate which is 12 cm in diameter and 1.1 mm thick. On the recording surface 31a of the substrate 31, information is recorded in advance in the form of phase pits. On this recording surface 31a on which information has been recorded, an Si film 50 nm thick is formed as a light-absorbing film 33, by the magnetron sputtering identical with that in the optical information recording medium 30 of Example 1 and on the same sputtering conditions as those of the optical information recording medium 30 of Example 1. Further on the light-absorbing film 33, a ZnO film 220 nm thick is formed as a temperature-sensitive film 32, in a similar manner. In short, the optical information recording medium 41 of Example 2 is identical with the optical information recording medium 30, except that the reflective film 34 is not provided between the light-absorbing film 33 and the substrate 31.

EXAMPLE 3

Figure 8:
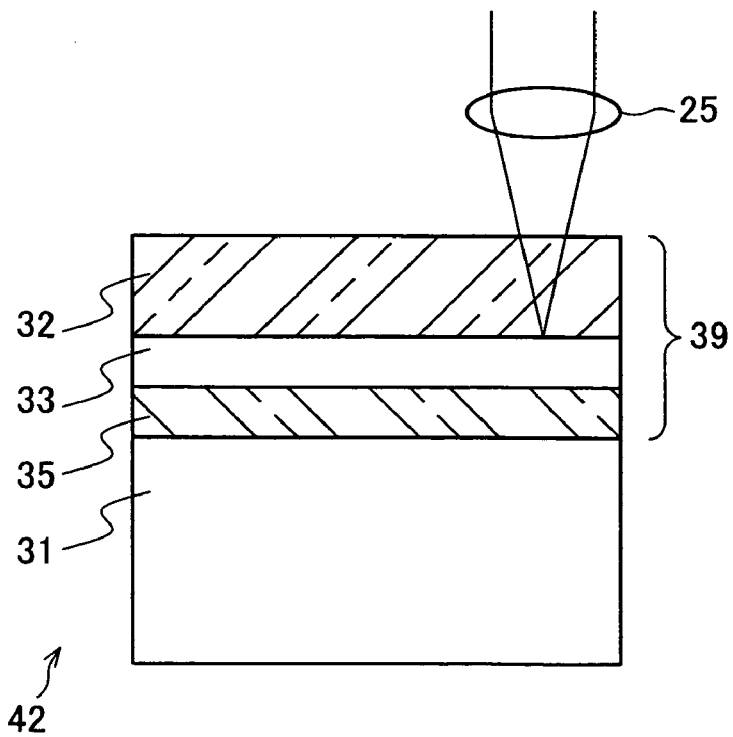
FIG. 8 is a cross section showing the structure of an optical information recording medium of Example 3 of the present invention, which exerts the medium super-resolution effect.

FIG. 8 is a cross section of an optical information recording medium 42 of Example 3, and this optical information recording medium 42 includes a three-layered film stack 39 in which a temperature-sensitive film 32, a light-absorbing film 33, and a transparent film 35 are deposited in this order from the incident-light side. Being identical with the optical information recording medium 30 of Example 1, the optical information recording medium 42 of Example 3 is arranged in the following manner: The transparent film 35 which is 20 nm thick and made up of an SiN film is formed on a recording surface 31a to which information is recorded, by the magnetron sputtering identical with that of Example 1. On this transparent film 35, a light-absorbing film 33 which is 50 nm thick and made up of an Si film is formed as in Example 1, and a temperature-sensitive film 32 which is 220 nm thick and made up of a ZnO film is further formed thereon. That is to say, in the optical information recording medium 42 of Example 3, the transparent film 35 made of SiN is formed between the light-absorbing film 33 and the substrate 31, instead of the reflective film 34 made up of the Al film. In other words, the optical information recording medium 42 of Example 3 is identical with the optical information recording medium 41 of Example 2, except that the transparent film 35 is provided between the light-absorbing film 33 and the substrate 31.

EXAMPLE 4

Figure 9:
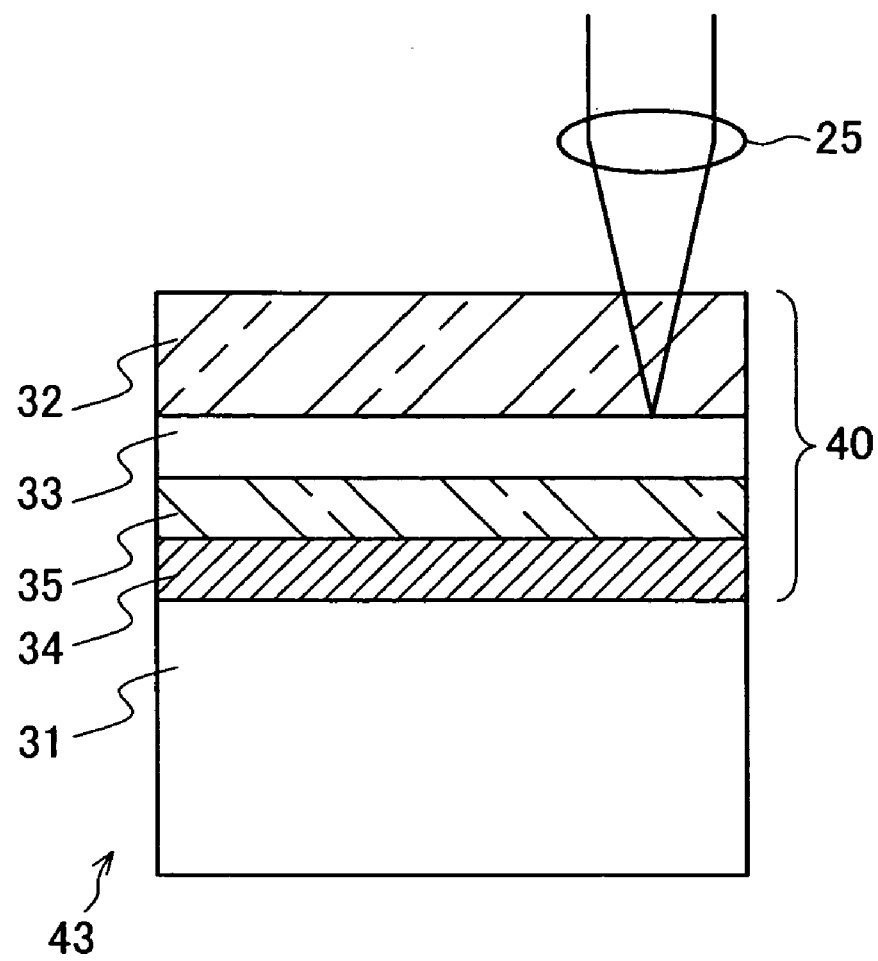
FIG. 9 is a cross section showing the structure of an optical information recording medium of Example 4 of the present invention, which exerts the medium super-resolution effect.

FIG. 9 is a cross section of an optical information recording medium (optical disk) 43 of Example 4, and this optical information recording medium 43 includes a four-layered film stack 40 in which a temperature-sensitive film 32, a light-absorbing film 33, a transparent film 35, and a reflective film 34 are deposited in this order from the incident-light side. Being identical with the optical information recording medium 30 of Example 1, the optical information recording medium 43 of Example 4 is arranged in the following manner: The reflective film 34 which is 30 nm thick and made up of an Al film is, by the magnetron sputtering identical with that of Example 1, formed on a recording surface 31a of the substrate 31, to which information is recorded. On this reflective film 34, the transparent film 35 which is 20 nm thick and made up of an SiN film is formed in a similar manner. On this transparent film 35, a light-absorbing film 33 which is 50 nm thick and made up of an Si film is formed, and a temperature-sensitive film 32 which is made up of a ZnO film and 220 nm thick is formed as an inorganic super-resolution film. That is to say, the optical information recording medium 43 of Example 4 is identical with the optical information recording medium 30 of Example 1 except that the transparent film 35 is further provided between the light-absorbing film 33 and the reflective film 34. In other words, the optical information recording medium 43 of Example 4 is equivalent to the optical information recording medium 42 of Example 3 with the reflective film 34 being added thereto.

Figure 10:
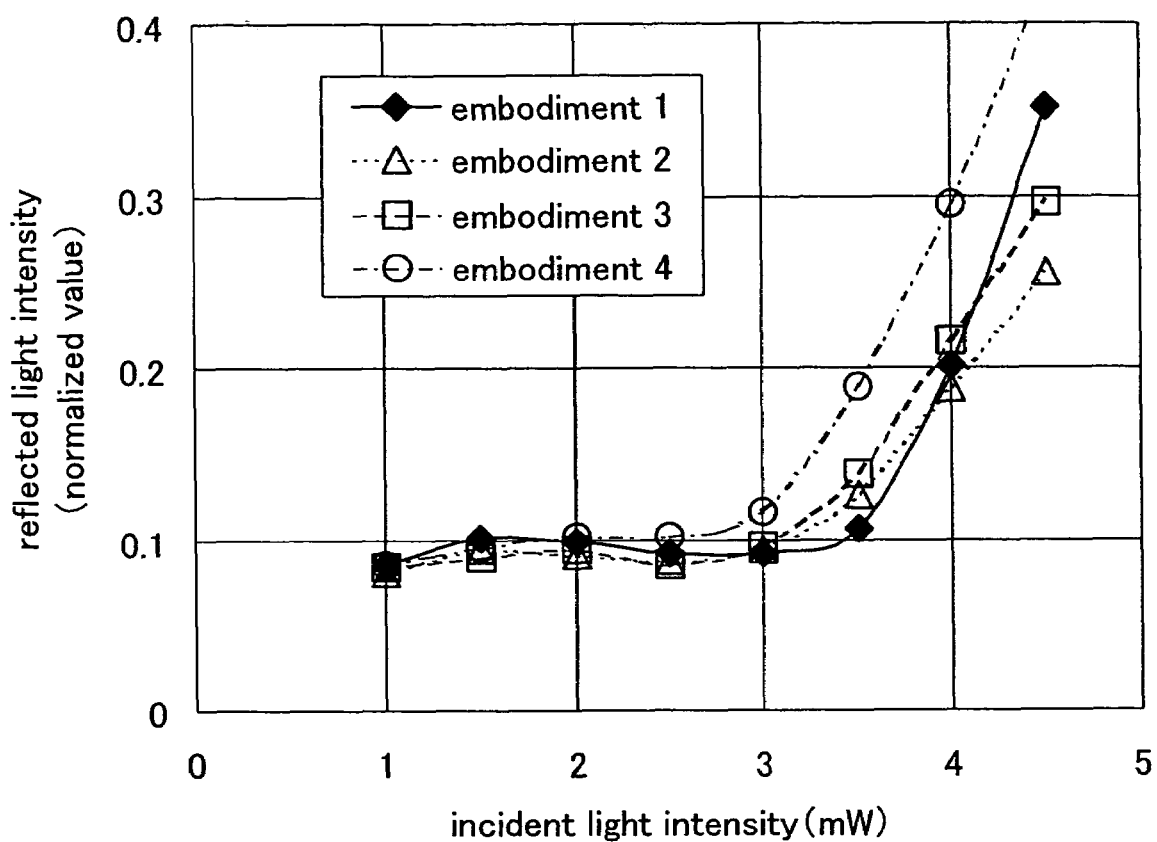
FIG. 10 illustrates how reflected light intensity (actual value) changes with respect to incident light intensity in each of the media of Examples 1-4.

FIG. 10 shows the results of measurement of reflected light intensities with regard to the incident light intensities in the optical information recording media 30 and 41-43 of Examples 1-4, which were measured using an evaluation device. The effects acquired by the respective examples will be shown below.

In the optical information recording medium 41 of Example 2, the reflective film 34 which is included in the optical information recording medium 30 of Example 1 is not provided. For this reason, the reflectance of the optical information recording medium 41 is inferior to the optical information recording medium 30 of Example 1. However, unlike the optical information recording medium 30 of Example 1, the reflective film 34 having a high thermal conductivity is not adjacent to the light-absorbing film 33, so that heat is not selectively propagated to the reflective film 34 on the occasion of the temperature rise of the light-absorbing film 33 because of the irradiation of light. For this reason, the thermal conduction to the temperature-sensitive film 32 is facilitated.

Thus, it is possible to easily increase the temperature of the temperature-sensitive film 32, and the increase of the reflectance is achieved with a reproduction power (3.5 n W) lower than that of the optical information recording medium 30 of Example 1. In other words, the sensitivity to the reproduction power is improved. It is noted, however, that the light-absorbing film 33 is formed directly on the substrate 31 as described above, and an inorganic film for protecting the light-absorbing film 33 is not provided. This results in an adverse effect when the reproduction power is high or in terms of durability for repeating playback.

The optical information recording medium 42 of Example 3 is, in other words, arranged such that the transparent film 35 is provided between the light-absorbing film 33 and the substrate 31 of the optical information recording medium 41 of Example 2. With this, the light-absorbing film 33 is protected and hence the durability is improved comparing to the optical information recording medium 41 of Example 2. Furthermore, compared to the optical information recording medium 30 of Example 1, the temperature of the optical information recording medium 42 of Example 3 can easily increased and the reflectance thereof can be increased with lower reproduction power (3.5 mW), for the same reason as the optical information recording medium 41 of Example 2. That is, the sensitivity to the reproduction power is improved.

In the optical information recording medium 42 of Example 3, the transparent film 35 is adopted for protecting the light-absorbing film 33. However, the transparent film 35 is required only for the protection of the light-absorbing film 33 and for heat insulation, thereby not necessarily being transparent. Being transparent is advantageous for increasing the number of layers, because transmitted light can be utilized.

In the optical information recording medium 43 of Example 4, the transparent film 35 is provided between the reflective film 34 and the light-absorbing film 33 of the optical information recording medium 30 of Example 1. In other words, the reflective film 34 is added to the optical information recording medium 42 of Example 3. Thus, compared to the optical information recording medium 30 of Example 1, the sensitivity to the reproduction power is improved because the light-absorbing film 33 is not directly in touch with the reflective film 34, as in the optical information recording medium 42 of Example 3. Furthermore, compared to the optical information recording medium 41 of Example 2, the light-absorbing film 33 is further protected and hence the durability is improved.

Also in this case, the film 35 is not necessarily transparent to protect the light-absorbing film 33, as in the optical information recording medium 42 of Example 3. However, since the reflective film 34 is provided in the optical information recording medium 43 of Example 4, the film 35 has to be transparent to meet the requirements for the protection, heat insulation, and light transmission. Compared to the optical information recording medium 41 and 42 of Examples 2 and 3, the optical information recording medium 43 of Example 4 is provided with the reflective film 34, thus being capable of utilizing transmission light by reflecting the same. For this reason, the efficiency of the use of light is improved and the reflected light is intensified.

Note that, the above-described effects regarding the optical information recording media 30 and 41-43 of Examples 1-4 are prominent when the incident light intensity is increased and the temperature of the temperature-sensitive film 32 is increased. On the other hand, when the incident light intensity is low and the temperature of the temperature-sensitive film 32 is around room temperatures, the optical information recording media of Examples 1-4 are arranged so as to be antireflective. For this reason, there are no particular differences in reflected light intensities between the optical information recording media 30 and 41-43 (see FIG. 10).

Although not being described, the aforementioned explanations relating to the film stack 7 of the optical information recording medium 30 of Example 1 apply to the optical information recording media 41-43 of Examples 2-4, in the following points: the conditions of the change of complex refractive index (=n−ki where i is an imaginary number) of the temperature-sensitive film 32 for realizing the increase of the reflectance in accordance with the temperature rise; the adjustment of the optical characteristics of the temperature-sensitive film 32 for further improving the recording density; and the adjustment of the multiple interference in the film stack 38-40.

Examples 1-4 have described a read-only disk on which recording marks have been formed on the substrate 31 in advance, as phase pits. However, the present invention is not limited to this, so that the effects similar to the above are acquired using a write-once optical information recording medium, phase-conversion optical information recording medium, and magneto-optical information recording medium, each including a recording layer which is provided on the substrate and records data.

For instance, to realize, in a write-once/rewritable optical information recording medium, a film stack whose reflectance increases as the incident light intensity increases, using the temperature-sensitive film 32 described in Examples 1-4, it is necessary to consider the reflectance change in a multi-layered structure including a recording layer and a film for controlling the thermal characteristics.

Incidentally, when a structure that allows the reflectance to increase when the incident light intensifies is adopted, the irradiated light pulse on the occasion of recording is 3-10 times stronger than the light pulse on the occasion of reproduction. For this reason, there is such a possibility that, as the reflectance of the optical information recording medium increases, the light absorption decreases, and as a result the recording marks are not properly formed.

However, the change of the complex refractive index of the temperature-sensitive film 32 does not infinitely follow the increase of the power, so that the change of the complex refractive index becomes consistent when the intensity of the light is not less than 6.0 mW. It has been confirmed that a graph of the change of the reflected light intensity with respect to the incident light intensity of not less than 6.0 mW is linear, i.e. the change of the reflected light intensity becomes in proportion to the incident light intensity. In other words, the reflectance becomes consistent when the incident light intensity is not less than 6.0 mW, and the reflectance does not change no matter how the incident light intensity is increased from 6.0 mW. Irrespective of the structure of the film stack of the optical information recording medium, the change of the reflectance becomes consistent at around 6.0 mW through 8.0 mW, in most of optical information recording media adopting an inorganic super-resolution film. Thus, the recording is carried out in the same manner as conventional arrangements, and the super-resolution effect is acquired only on the occasion of reproduction.

Figure 11:
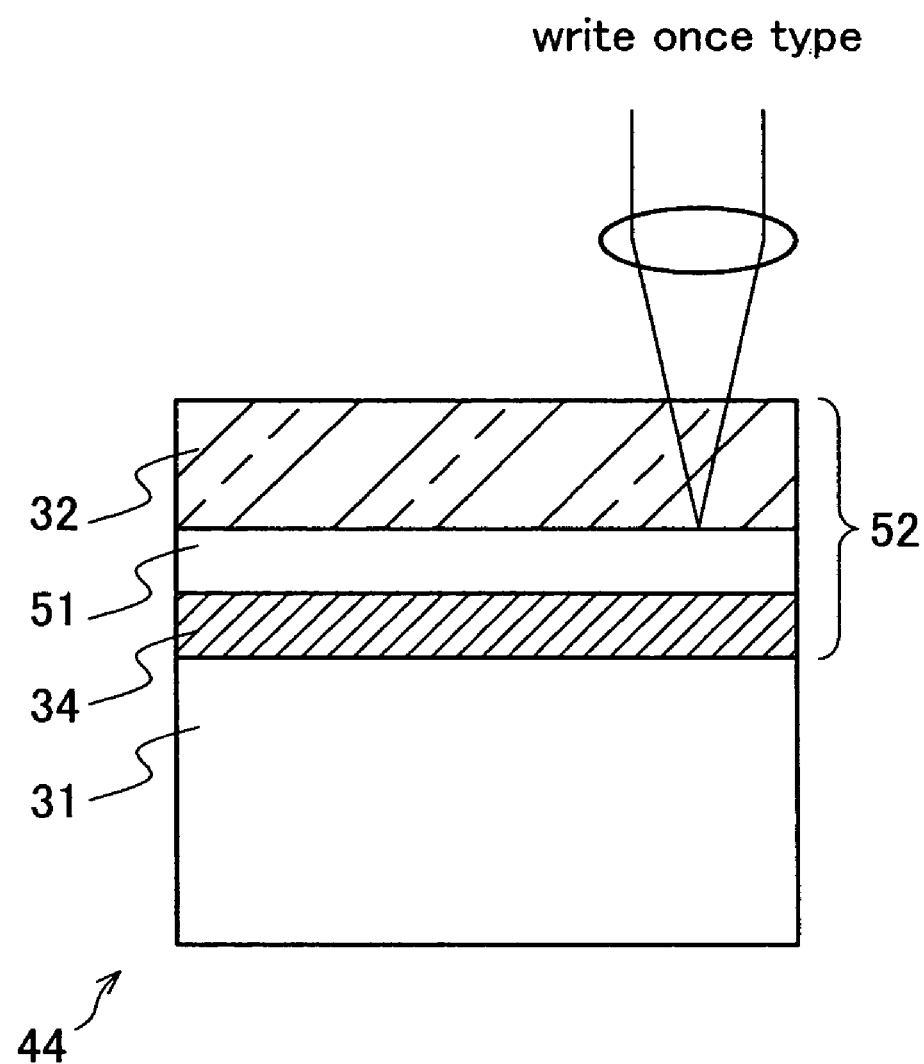
FIG. 11 is a cross section showing the structure of an optical information recording medium of an embodiment of the present invention, which exerts the medium super-resolution effect.
Figure 12:
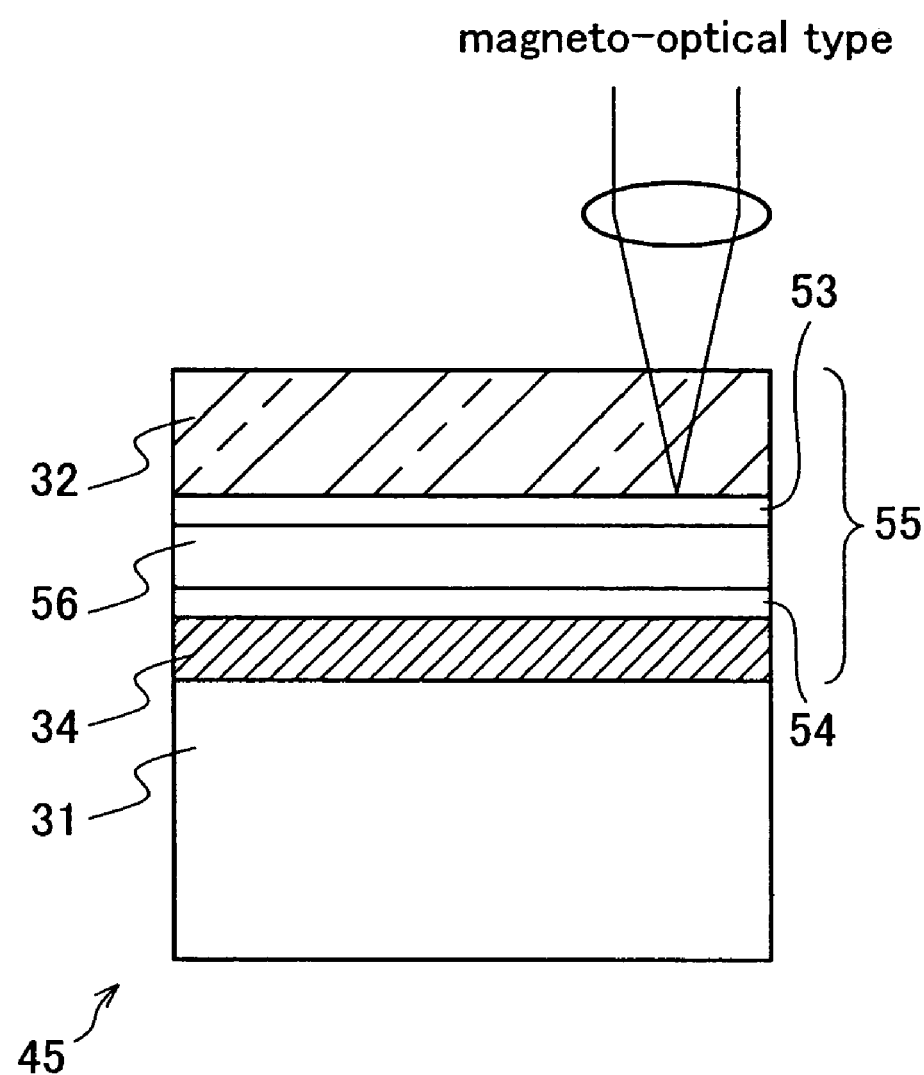
FIG. 12 is a cross section showing the structure of an optical information recording medium of an embodiment of the present invention, which exerts the medium super-resolution effect.
Figure 13:
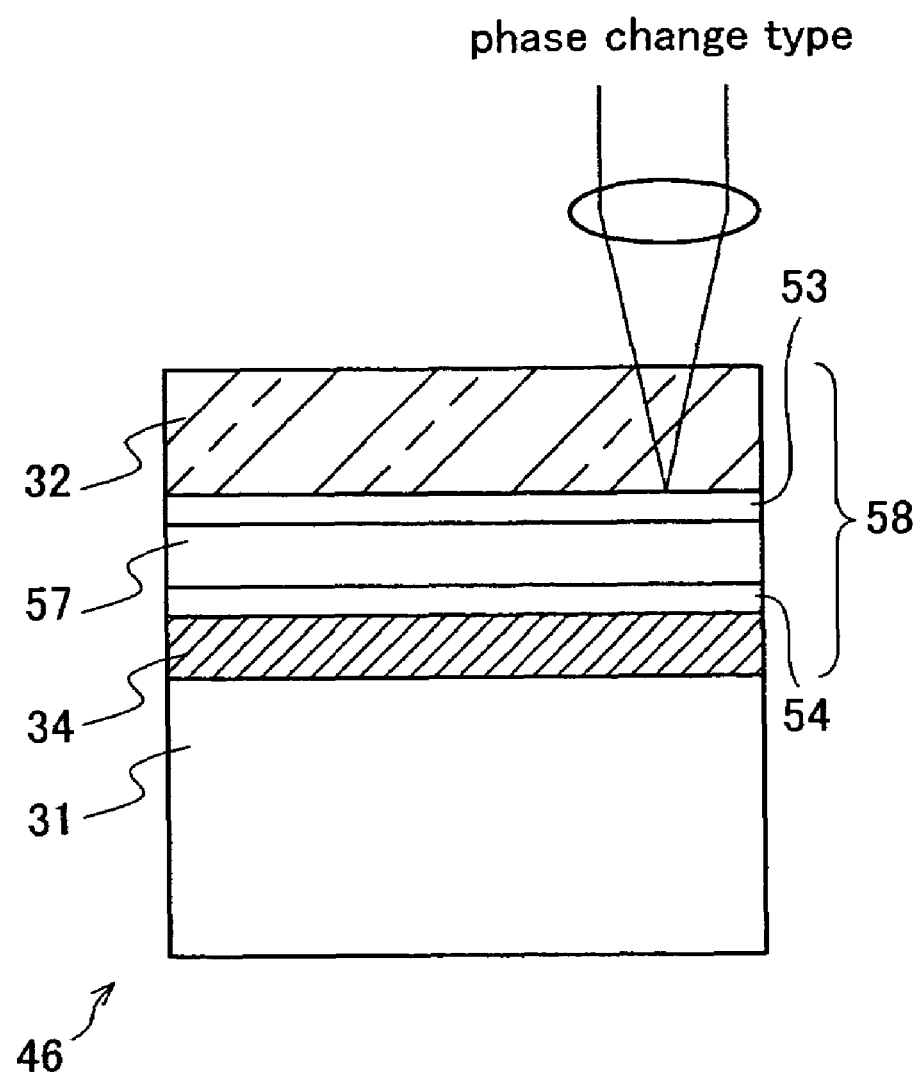
FIG. 13 is a cross section showing the structure of an optical information recording medium of an embodiment of the present invention, which exerts the medium super-resolution effect.

Now, referring to FIGS. 11-13, an optical information recording medium including a recording layer is described. FIG. 11 is a cross section of an optical information recording medium 44 which is arranged such that the structure of the optical information recording medium of the present invention is adopted to a write-once optical information recording medium. From the incident-light side, a temperature-sensitive film 32, a write-once recording film 51, and a reflective film 34 are deposited in this order on a substrate 31, so as to constitute a film stack 52. These thin films constituting the film stack 52 are arranged in such a manner that the optical multiple interference is changed in accordance with the change of the complex refractive index of the temperature-sensitive film 32, so that the reflectance is changed.

In the arrangement illustrated in the figure, since the write-once recording film 51 absorbs light and contributes to the temperature rise of the temperature-sensitive film 32, a light-absorbing film 33 is not provided. However, in some cases a light-absorbing film 33 may be provided for facilitating the operation of the temperature-sensitive film 32. The light-absorbing film 33 may be provided between the temperature-sensitive film 32 and the write-once recording film 51 or between the write-once recording film 51 and the reflective film 34, as long as the facilitation of the operation of the temperature-sensitive film 32 is achieved.

With the foregoing arrangement, the super-resolution reproduction of the recording bit of the write-once recording film 51 to which the write-once operation is carried out is achieved by utilizing the temperature change of the temperature-sensitive film 32, as in the case of the above-described playback-only medium.

FIG. 12 is also a cross section of an optical information recording medium 45 in which the arrangement of the optical information recording medium of the present invention is adopted to a magneto-optical information recording medium. From the incident-light side, a temperature-sensitive film 32, a first protective film 53, a magneto-optical recording film 56, a second protective film 54, and a reflective film 34 are deposited in this order on a substrate 31, so as to constitute a film stack 55.

In the arrangement illustrated in the figure, since the magneto-optical recording film 56 is apt to be oxidized, the first and second protective films 53 and 54 are provided as anti-oxidant films. Since the magneto-optical recording film 56 absorbs light and hence contributes to the temperature rise of the temperature-sensitive film 32, a light-absorbing film 33 is not provided in the figure. However, in some cases a light-absorbing film 33 may be provided for facilitating the operation of the temperature-sensitive film 32. In such a case, the light-absorbing film 33 may be provided between any pair of films on condition that the facilitation of the operation of the temperature-sensitive film 32 is achieved.

With the foregoing arrangement, the super-resolution reproduction of the recording bit of the magneto-optical recording film 56 to which the magneto-optical recording operation is carried out is achieved by utilizing the temperature change of the temperature-sensitive film 32, as in the case of the above-described playback-only medium.

FIG. 13 is also a cross section of an optical information recording medium 46 in which the arrangement of the optical information recording medium of the present invention is adopted to a phase-conversion optical information recording medium. From the incident-light side, a temperature-sensitive film 32, a first protective film 53, a phase-conversion recording film 57, a second protective film 54, and a reflective film 34 are deposited in this order on a substrate 31, so as to constitute a film stack 58.

In the arrangement illustrated in the figure, the first and second protective films 53 and 54 are provided for protecting the phase-conversion recording film 57 from degradation, oxidation, shape distortion, stress strain, and so on. Since the phase-conversion recording film 57 absorbs light and hence contributes to the temperature rise of the temperature-sensitive film 32, a light-absorbing film 33 is not provided in the figure. However, in some cases a light-absorbing film 33 may be provided for facilitating the operation of the temperature-sensitive film 32. In such a case, the light-absorbing film 33 may be provided between any pair of films on condition that the facilitation of the operation of the temperature-sensitive film 32 is achieved.

With the foregoing arrangement, the super-resolution reproduction of the recording bit of the phase-conversion recording film 57 to which the phase-conversion recording operation is carried out is achieved by utilizing the temperature change of the temperature-sensitive film 32, as in the case of the above-described playback-only medium.

In the optical information recording media 30 and 41-43 of Example 1-4, the temperature-sensitive film 32 is located on the outermost of the film stack 37, 38, 39, or 40, so as to be open to the air. However, as described above, an ultraviolet curing resin film may be provided on the surface of the film stack 37, 38, 39, or 40, as a film for protecting the film stack.

Figure 14:
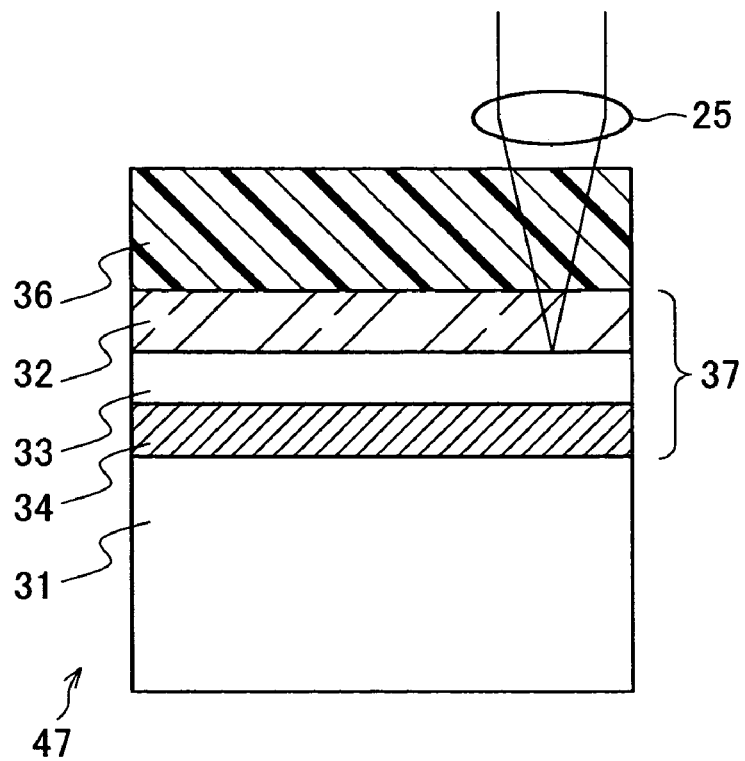
FIG. 14 is a cross section showing the structure of an optical information recording medium of an embodiment of the present invention, which exerts the medium super-resolution effect.

As an example of such an arrangement, FIG. 14 shows a cross section of an optical information recording medium 47 in which an ultraviolet curing resin film 36 is provided on the surface of the film stack 37 of the optical information recording medium 30 of Example 1. As the figure shows, when the ultraviolet curing resin film 36 is provided on the outermost part of the fill stack 37, it is possible to prevent the film stack to be damaged due to the collision with, for instance, the optical head. In this optical information recording medium 47, a light beam reaches the film stack 37 after passing through he ultraviolet curing film 36.

In the optical information recording medium 30 of Example 1, the film stack 37 is provided on the incident-light side of the substrate 37. However, the optical information recording medium 30 may be arranged such that a light beam reaches the film stack 37 after passing through the substrate 31.

Figure 15:
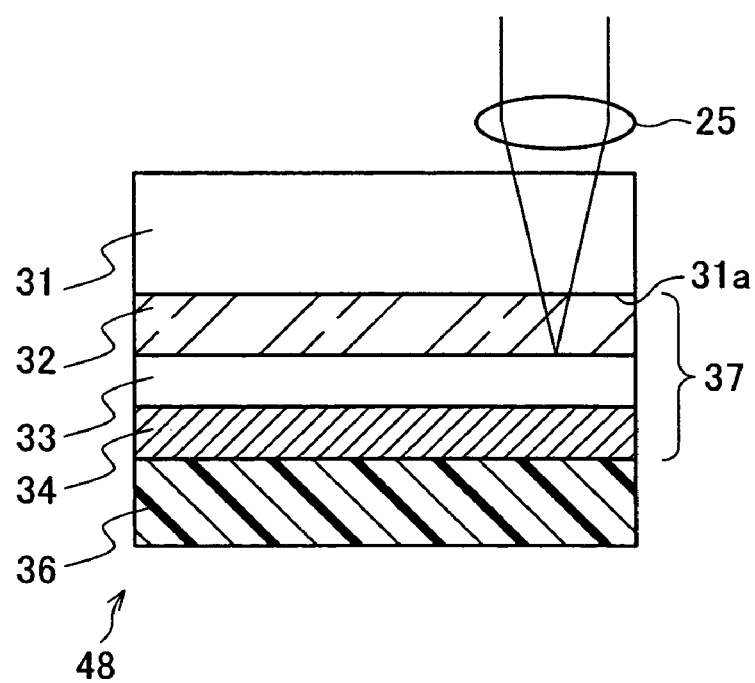
FIG. 15 is a cross section showing the structure of an optical information recording medium of an embodiment of the present invention, which exerts the medium super-resolution effect.

FIG. 15 shows a cross section of an optical information recording medium 48 in which a light beam reaches the film stack 37 after passing through the substrate 31. In this case, the order of the deposited films is inversed in comparison with the optical information recording medium 30 of Example 1. More specifically, on the substrate 31, a temperature-sensitive film 32, a light-absorbing film 33, and a reflective film 34 are formed in this order. Note that, in the arrangement illustrated in FIG. 15, an ultraviolet curing resin film 36 is further provided on the surface (on the opposite side to the substrate 31) of the film stack 37, as a film for protecting the film stack 37.

In such an optical information recording medium 48, light is read through the substrate 31 and hence a reading error rarely occurs even if a read surface (surface of the substrate) of the optical information recording medium 47 is damaged.

It is noted that, however, the films of the optical information recording media 47 and 48 of FIGS. 14 and 15 are different in arrangement from the films of the optical information recording medium 30 of Example 1, so that, in the optical information recording media 47 and 48, heat transfer changes in accordance with the heat conductions of the respective films. Since the operation of the temperature-sensitive film 32 is sensitive to the temperature change of the optical information recording medium, the thicknesses and materials of the films are required to be optimized.

When the temperature-sensitive film 32 is provided at the outermost part of the film stack 37 and hence in touch with the air as in the optical information recording medium 30 of Example 1, the heat radiation from the temperature-sensitive film 32 is restrained comparing to a case that the temperature-sensitive film is in touch with a substrate 31, an inorganic film (e.g. reflective film 34 and transparent film 35) or an ultraviolet curing resin film 36. Since the temperature rise is thus achieved with a lower reproduction power, the sensitivity to the reproduction power is improved.

The incident light is maximally utilized also when a complex refractive index changing film whose change of complex refractive index is directly caused by light is provided in such a manner that the incident light primarily enters the complex refractive index changing film before passing through other films. This arrangement facilitates the change of the complex refractive index.

EXAMPLE 5

When a recording section multi-layered recording medium whose storage capacity is increased by forming a plurality of recording surfaces or recording layers in one optical information recording medium is combined with a structure by which the reflectance is increased as in the optical information recording media 30 and 41-43 of Examples 1-4, not only the recording densities of the respective layers are increased thanks to the super-resolution effect but also the auto-focus and tracking are stabilized. This is because the reflectance is increased only when the respective recording layers are in focus.

In the recording section multi-layered recording medium, when the reflectance of the recording sections on the incident-light side (i.e. the film stack including the recording layers or the recording surface and the film stack adjacent to the same) is high, the light cannot reach the next recording section, so that the recording and reproduction cannot be carried out. To solve this problem, it is necessary to restrain the reflectance of the recording sections on the incident-light side as low as possible, in order to allow all of the recording sections to carry out the recording and reproduction. However, since restraining the reflectance results in unstable auto-focus and tracking, it is extremely difficult to properly set the reflectance of the film stacks.

In the optical information recording media 30 and 41-43 of Examples 1-4, the effect (see FIG. 5) of reflectance change, which occurs when the incident light intensity is increased, does not occur when the light is out of focus for 2 μm (i.e. the length about twice as much as the focal depth). This indicates that the above-mentioned effect is acquired when the power-density of the light is high enough.

Generally, the distance between the recording sections of the recording section multi-layered recording medium is about 20 μm through 50 μm. When the above-mentioned film stack 37-40 in which the reflectance is increased in accordance with the change of the complex refractive index of the temperature-sensitive film 32 is adopted to the recording sections of the recording section multi-layered recording medium, it is considered that the neighboring temperature-sensitive films 32 do not influence on each other with regard to the reflectance change. This is because, when one of the recording section is focused, the distance between that recording section and the next recording section is much longer than the focal depth.

Thus, no problem occurs when the reflectance of a recording section being out of focus is restrained to be low. In other words, sufficient reflectance is acquired when the recording section is focused, so that the auto-focus and tracking are stabilized. Moreover, taking this into consideration, it is possible to reduce the distance between the recording sections of the recording section multi-layered recording medium to 2 μm through 20 μm.

Note that, however, in the recording section multi-layered recording medium, the spot is degraded due to spherical aberration, when the number of recording sections is large. For this reason, the realistic number of the recording sections is two.

Figure 16:
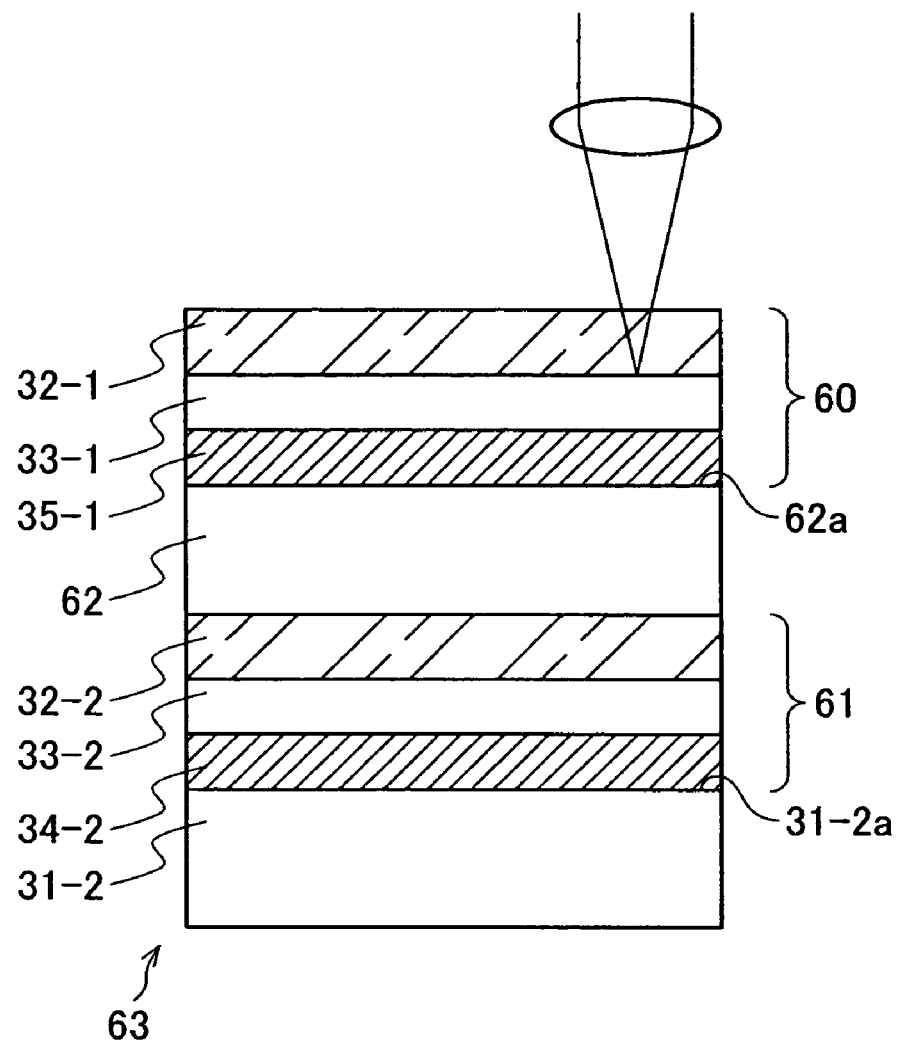
FIG. 16 is a cross section showing the structure of an optical information recording medium of Example 5 of the present invention, which exerts the medium super-resolution effect.

As Example 5 of the present invention, FIG. 16 shows a cross section of a recording section multi-layered recording medium with two recording sections. The following will discuss such a case that the present invention is adopted to an arrangement that information is recorded in advance in the form of phase pits, the arrangement having been proposed as, for instance, Blu-ray Disc®.

In the optical information recording medium 63, from the incident-light side, the following members are deposited on a substrate 31-2: a first recording section made up of a recording surface 62a which is the surface of an ultraviolet curing resin 62 and a first film stack 61 adjacent to the recording surface 62a; and a second recording section made up of a recording surface 31-2a which is the surface of the substrate 31-2 and a second film stack 61 adjacent to the recording surface 31-2a.

The second film stack 61 is provided on the first film stack 60 with the ultraviolet curing resin 20 μm thick being interpolated therebetween. The first film stack 60 is arranged such that, from the incident-light side, a temperature-sensitive film (ZnO film) 32-1 which is 220 nm thick, a light-absorbing film (Si film) 33-1 which is 30 nm thick, and a transparent film (SiN film) 35-1 which is 20 nm are deposited. The second film stack 61 is arranged such that, as in the first film stack 60, a temperature-sensitive film (ZnO film) 32-2 which is about 220 nm, a light-absorbing film (Si film) which is about 30 nm, and a reflective film (Al film) which is about 100 nm are provided.

In such an arrangement, on the substrate 31-2, information is recorded in advance in the form of irregularities (phase pits), and on the recording surface 31-2a of this substrate 31-2, the above-mentioned reflective film 34-2, light-absorbing film 33-2, and temperature-sensitive film 32-2 with the above-described thicknesses are formed by magnetron sputtering. Subsequently, the ultraviolet curing resin 62 is applied thereto. Then, information is recorded by phase pits shaped similar to the irregularities on the substrate 31-2, using an ultraviolet-light-transmissive transcriptional stamper. In this state of things, the ultraviolet curing resin 62 is cured by applying ultraviolet light from the stamper side, and the stamper is then removed. As a result, the recording surface 62a is formed on the ultraviolet curing resin 62. Subsequently, on the recording surface 62a of the ultraviolet curing resin 62, the above-described transparent film 35-1, light-absorbing film 33-1, and temperature-sensitive film 32-1 with the above-described thicknesses are also formed by magnetron sputtering as in the same manner as above.

The reproduction is carried out in such a manner that the reproduction light is applied from the temperature-sensitive film 32-1 side of the film stack 60. Although the thicknesses are different because of the difference in heat transfer, the first film stack 60 corresponds to the film stack 39 of the optical information recording medium 42 of Example 3 and the second film stack 61 corresponds to the film stack 37 of the optical info recording medium 30 of Example 1, in terms of the arrangement of the films.

To cause the first film stack 60, which is on the incident-light side, not to reflect all of the incident light, the transparent film 35-1 of the film stack 60 has optical transmittance higher than that of the reflective film 34-2 of the second film stack 61. The transparent film 35-1 can protect the light-absorbing film 33-1, insulate heat to the light-absorbing film 33-1, and let the light to reach the second film stack 61. As a result, providing the transparent film 35-1 brings about such advantages that the light-absorbing layer is protected, the sensitivity to the reproduction power of the first film stack 60 is increased, and the number of the layers can be increased.

In a conventional optical information recording medium having two-layered recording sections, the reflectance of the first film stack 60 is low, so that optical information recording medium cannot stably carry out the auto-focus and tracking and is vulnerable to the disturbance on the occasion of the reproduction.

On the other hand, in the optical information recording medium 63 of Example 5, the reflectance of the first and second film stacks 60 and 61 increases as the incident light intensity intensifies, and this increase of the reflectance occurs only when the temperature-sensitive film 32-1 locates within the focal depth of the reproduction light.

That is to say, when the recording surface 62a of the first film stack 60 is read, the reflectance of the first film stack 60 is increased by causing the light to focus on the first recording section including the first film stack 60. With this, the auto-focus and tracking are stabilized.

To read the second recording section including the second film stack 61, the light is caused to focus on the second recording section so that the reflectance of the second film stack 61 is increased. In the meantime, since the light is significantly out of focus with respect to the super-resolution layer of the first film stack 60, the increase of the reflectance does not occur in the first film stack 60, thereby not causing an adverse effect to the reading of the second recording layer.

For this reason, it is possible to make the distance between the neighboring first and second recording sections be narrower than the distance in a conventional recording section multi-layered recording medium. More specifically, in the conventional recording section multi-layered recording medium the distance is typically 20 μm through 50 μm. According to the present invention, meanwhile, the distance can be reduced to 2 μm through 20 μm. Furthermore, the distance between the neighboring first and second recording sections can be further reduced by adjusting the thickness of the ultraviolet curing resin provided between the recording sections.

Both the first recording section (on the incident-light side) and the second recording section (next to the first film stack when viewed from the incident-light side) are combined with films in each of which the change of a complex refractive index occurs, so that the reflectance of the first and second recording sections is increased. Alternatively, since no recording section is provided next to the second recording section, the second recording section may be arranged in such a manner that the reflectance thereof is increased and the temperature-sensitive film 32 is not included. That is to say, the first recording section on the incident-light side may be arranged in such a manner that the reflectance thereof is set to be low, and a film made of the same materials as the temperature-sensitive film 32 of Examples 1-4 is adopted so that the reflectance of the first recording section is increased only when the light focuses on the first recording section. Also, among a plurality of recording sections, the recording section furthest from the incident-light side may be arranged such that the reflectance thereof is set to be high and the temperature-sensitive film 32 is not included. When the complex refractive index changing film is adopted only to the first recording section, the difficulty of properly setting the reflectance is tempered, and hence the possibility of realizing a recording section multi-layered recording medium having two layers is increased.

Regardless of the number of recording sections, the reflectance is increased and absorptance is relatively decreased on the occasion of the reading, as described above. The loss of data due to the reading light is prevented without decreasing the recording sensitivity, by determining the thicknesses of the films in such a manner as to cause the reflectance to be low when very intense laser is applied on the occasion of the recording.

Apart from the above-mentioned ZnO film, as an inorganic super-resolution film, a temperature-sensitive film made of any one of oxide, nitride, sulfide, fluoride, and carbide which are combinations of more than one element, or a thin film made of a mixture or compound made of the foregoing substances.

Figure 17:
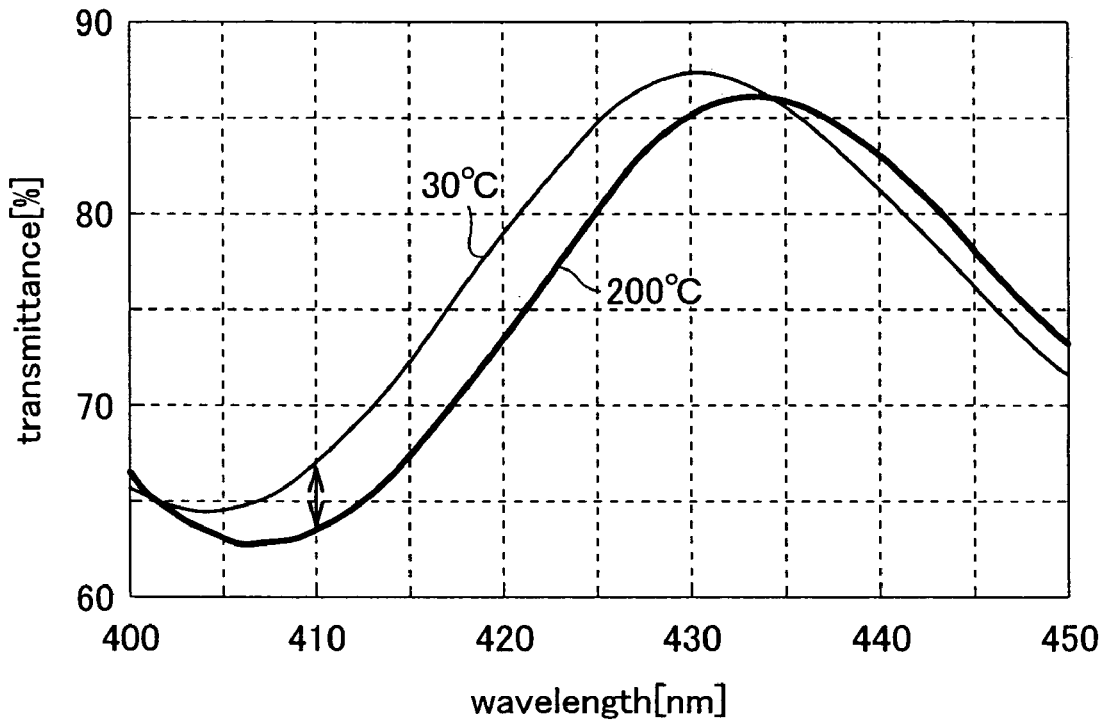
FIG. 17 illustrates the spectrum of a single ZnS—$SiO_2$ film which is a complex refractive index changing film, the spectrum indicating the relationship between a transmittance and an wavelength.
Figure 18:
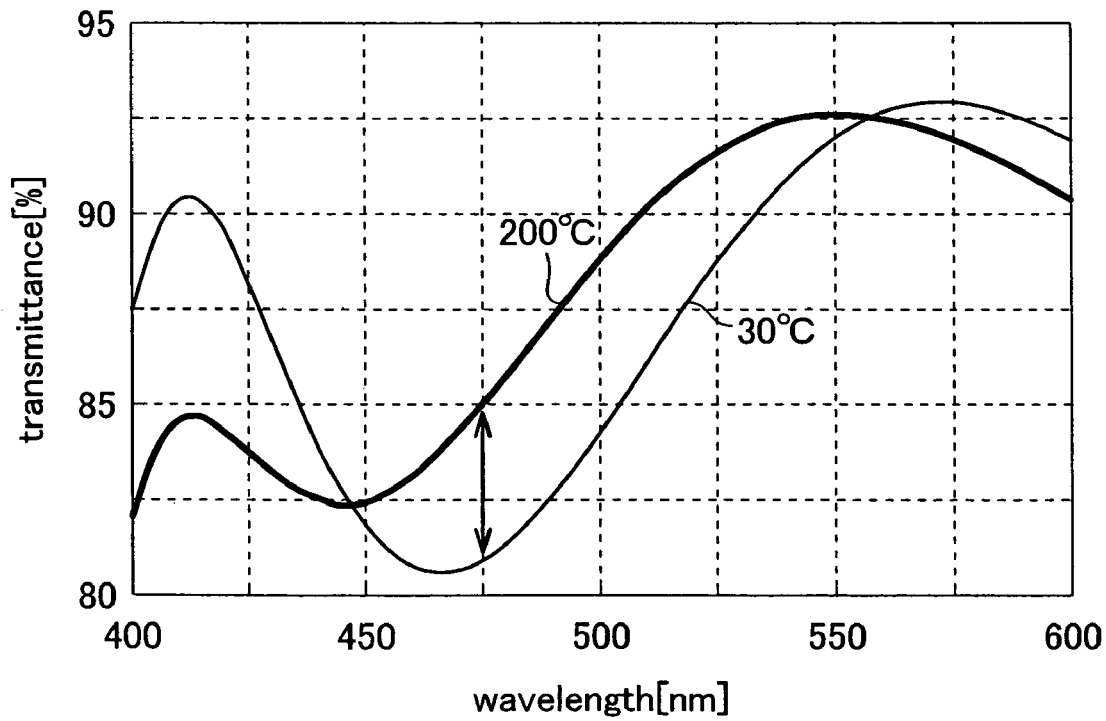
FIG. 18 illustrates the spectrum of a single $CeO_2$ film which is a complex refractive index changing film, the spectrum indicating the relationship between a transmittance and an wavelength.
Figure 19:
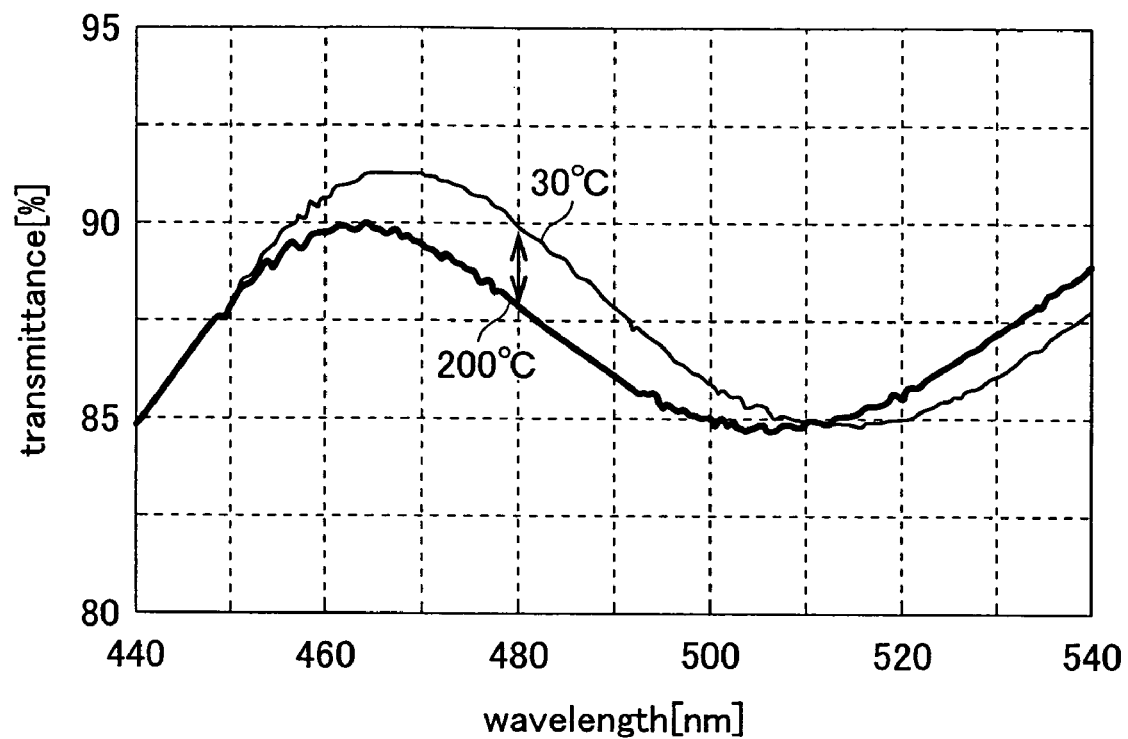
FIG. 19 illustrates the spectrum of a single $SnO_2$ film which is a complex refractive index changing film, the spectrum indicating the relationship between a transmittance and an wavelength.

Finally, as in the case of the above-described ZnO film, the change of the transmittance of a ZnS—$SiO_2$ film, a $CeO_2$ film, and a $SnO_2$ film constituting the temperature-sensitive film, the change being in accordance with the temperature change, are described in FIG. 17 (ZnS—$SiO_2$), FIG. 18 ($CeO_2$), and FIG. 19 ($SnO_2$), respectively.

Being identical with the case shown in FIG. 3, the transmittance spectrum shifts with respect to the measured wavelength, as a result of the temperature change. Focusing on a particular measured wavelength, the change of the transmittance is observed. Thus, as with ZnO, the above-mentioned materials can be used for forming a temperature-sensitive film which can be used for the optical information recording media 30 and 41-43 of Examples 1-5. When adopting these materials, it is necessary to adjust the thickness and optical constant in order to optimize the change at a desired measured wavelength, and also optimize the heat transfer of the film stack as described above.

In such a temperature-sensitive film (made of ZnO, ZnS—SiO$_2$, CeO$_2$, SnO$_2$ and the like), the rate of the change of the extinction coefficient k is small enough compared to the rate of the change of the refractive index n. For this reason, the change of the refractive index greatly influences on the change of the reflectance. Furthermore, since the absolute value of the extinction coefficient k is about 0, it is possible to keep the transmittance high. Thus, the efficiency of the use of light is improved.

As long as the light is irradiated from the film stack side, the above-described optical information recording medium may be adhered to another optical information recording medium having an identical structure, with an adhesive interposed therebetween. This makes it possible to increase the strength of the optical information recording medium and allows both of the surfaces of the optical information recording medium to record information.

EXAMPLES 6-10

Above-described Examples 1-5 chiefly relate to the antireflection structure. In Examples 6-10, in the meantime, how the effect of super-resolution reproduction is achieved even if the optical interference structure is not antireflective will be described with reference to medium structures of Examples 1-5.

The medium structures of Examples 6-10 of the present invention are identical with those in Example 1 and FIG. 2, except the thickness of the temperature-sensitive film 32. The way of forming thin films is also identical with that of Example 1, so that an Al film 30 nm thick is formed as a reflective film 34, an Si film 50 nm thick is formed as a light-absorbing film 33, and a ZnO film is formed as a temperature-sensitive film 32. With these commonalities, the media of Examples 6-10 are acquired by variously changing the thickness of the temperature-sensitive film (ZnO film) 32, in order to differentiate the optical interference structures.

Table 2 shows the thicknesses of the respective temperature-sensitive films 32 of Examples. These Examples are identical with each other except the thicknesses of the temperature-sensitive films 32. Because of this difference between the thicknesses, Examples have different optical interference structures, and hence have different reflectance of the optical information recording media 30 and different wavelength dependencies.

Figure 22:
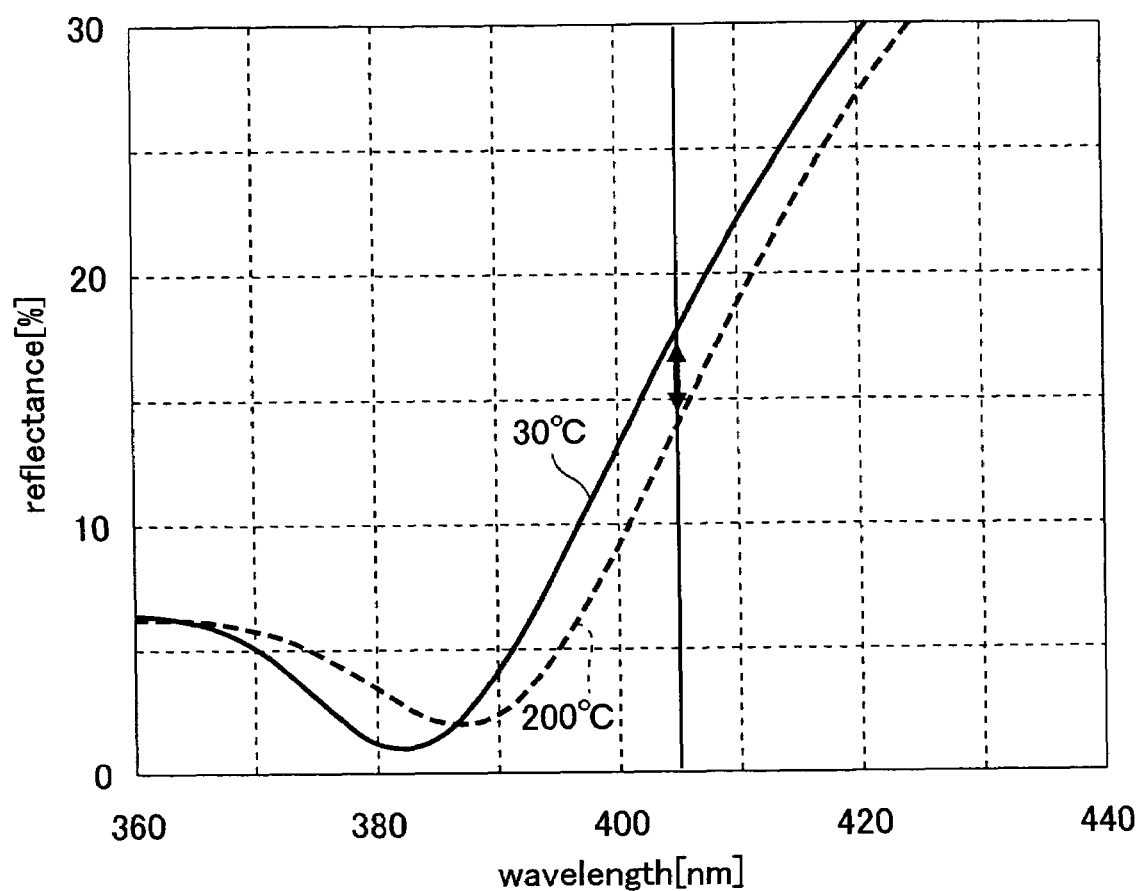
FIG. 22 shows the spectrum of an optical information recording medium of Example 6, the spectrum indicating the relationship between reflectance and an wavelength.
Figure 23:
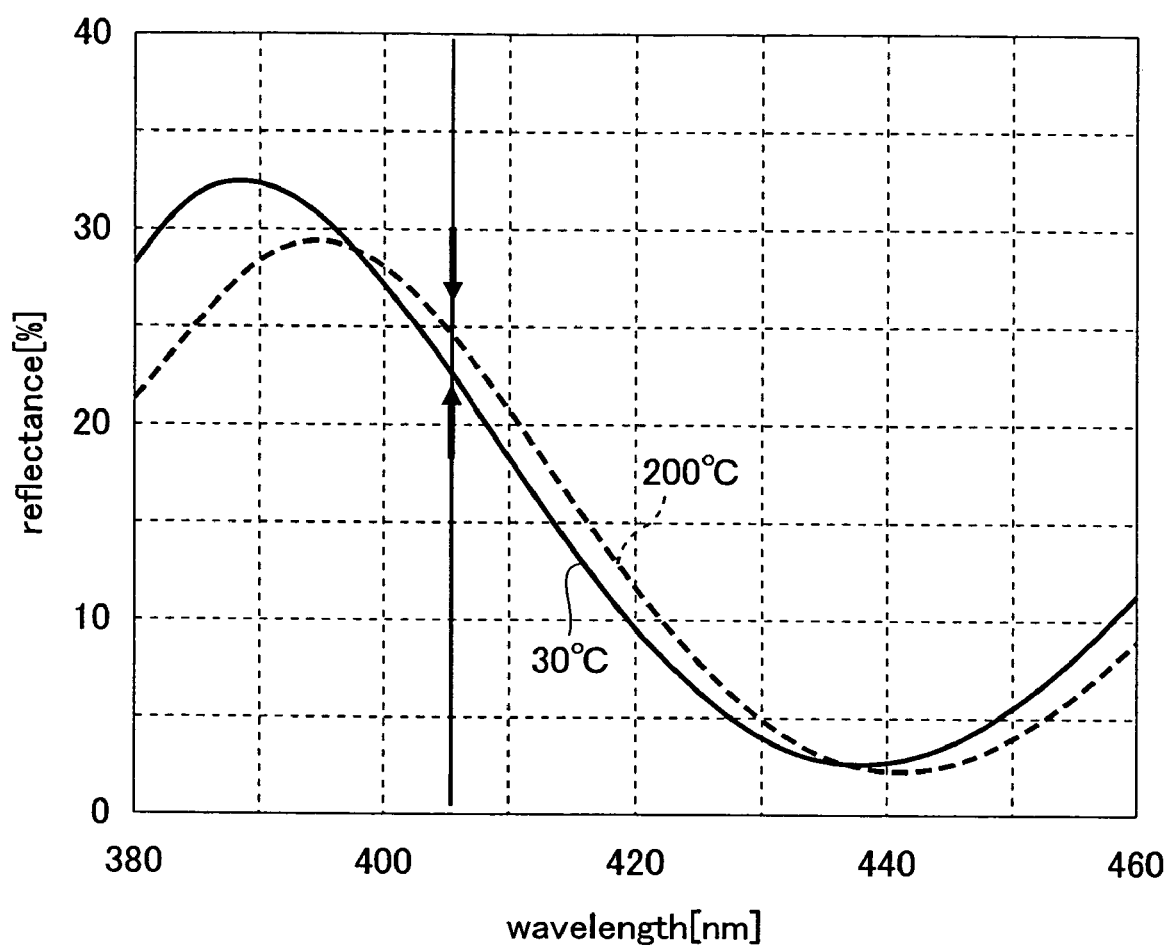
FIG. 23 shows the spectrum of an optical information recording medium of Example 9, the spectrum indicating the relationship between reflectance and an wavelength.
Figure 24:
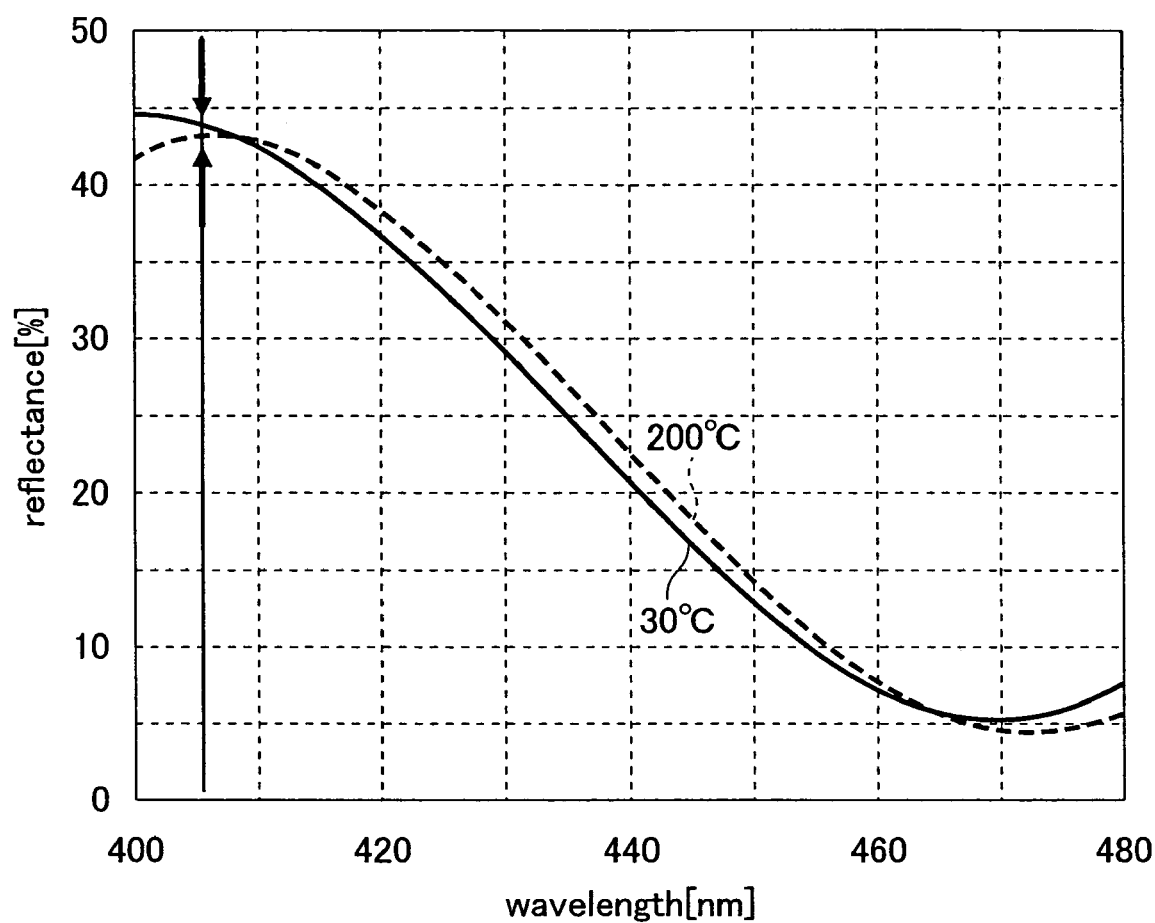
FIG. 24 shows the spectrum of an optical information recording medium of Example 10, the spectrum indicating the relationship between reflectance and an wavelength.
Figure 25:
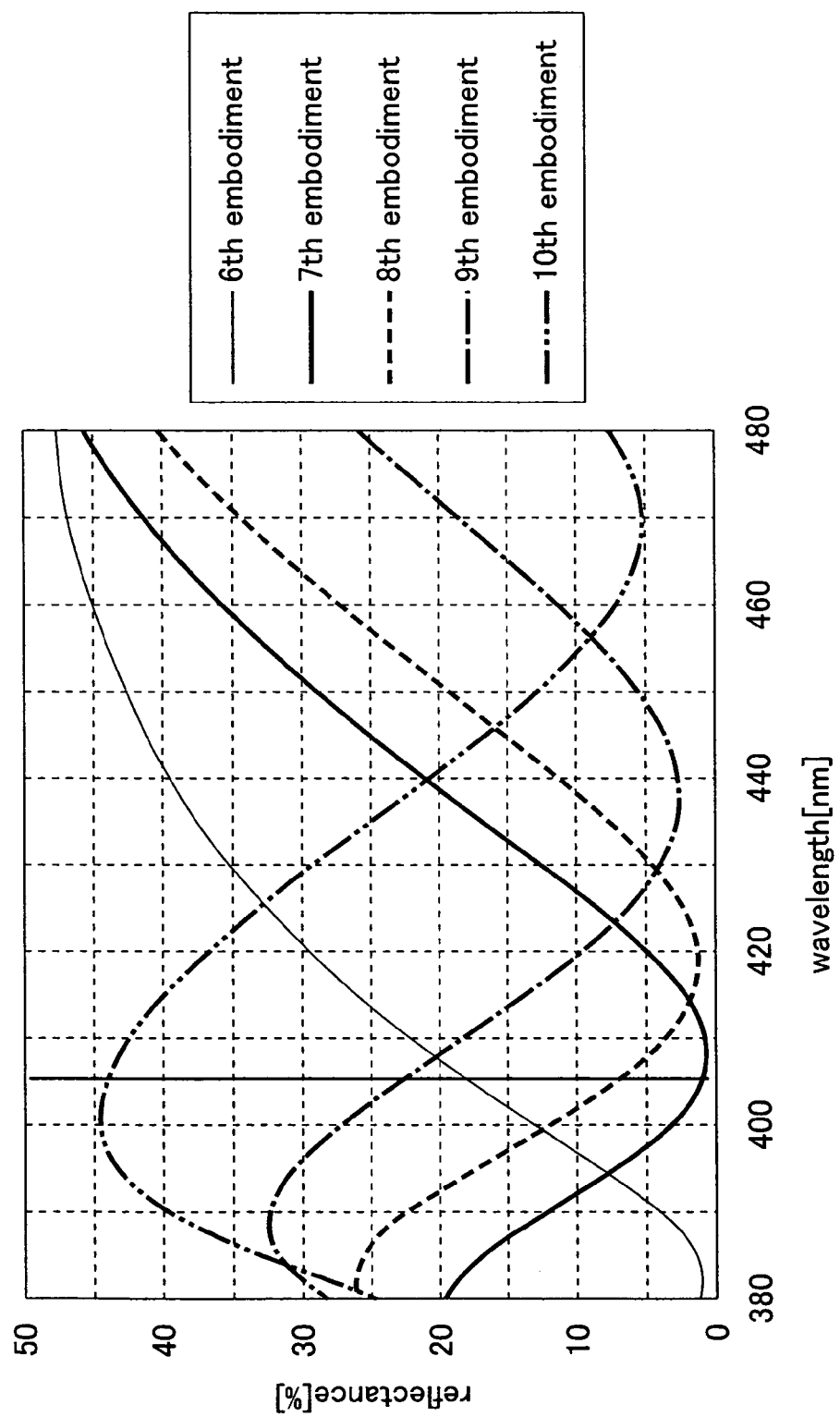
FIG. 25 shows the spectra of optical information recording media of Examples 6-10, the spectra indicating the relationship between reflectance and wavelengths.

FIG. 22 shows the wavelength dependency of the reflectance of the optical information recording medium 30 of Example 6, FIG. 23 shows the wavelength dependency of the reflectance of the optical information recording medium 30 of Example 9, and FIG. 24 shows the wavelength dependency of the reflectance of the optical information recording medium 30 of Example 10. These figures show that the wavelength dependencies of the reflectance are different between Examples. For the comparison between these Examples, FIG. 25 shows these wavelength dependencies of the reflectance in Examples 6-10 in one graph. According to the graph, one can understand that Examples 6-10 can be classified and compared with each other when the wavelengths are determined to minimize the reflectance of the respective samples.

Thus, in conformity to Table 2, the following illustrates the wavelengths at which the reflectance is minimized (hereinafter, these wavelengths are referred to as minimizing wavelengths, for the sake of simplicity) around 405 nm which is the reproduction wavelength. In addition to them, C/N values of continual pits each having a mark strength of 0.14 μm at the reproduction power of 4.0 mW are illustrated.

TABLE 2

|  | Example 6 | Example 7 | Example 8 | Example 9 | Example 10 |
|---|---|---|---|---|---|
| thickness (nm) of temperature-sensitive film | 120 | 135 | 140 | 150 | 165 |
| wavelength (nm) at which reflectance is minimum | 380 | 408 | 418 | 440 | 470 |
| 0.14 μm pit C/N (dB) | 31.5 | 34.0 | 38.5 | 43.1 | 16.2 |

As in Example 1, in the present optical system, the optical cutoff is a mark length of 0.157 μm. For this reason, since, in all of the optical information recording media of Examples 6-10, the C/N values are acquired with respect to the pit of 0.14 μm long, the super-resolution reproduction is realized, i.e. the objective of the present invention is achieved in all of the optical information recording media of Examples 6-10. On the other hand, as shown in FIG. 6 of Example 1, in the result 161 of the optical information recording medium of the comparative example, the C/N value with respect to the mark length 0.16 μm which is close to the optical cutoff (mark length of 0.157 μm) is substantially fallen to 0.

All of the C/N values corresponding to Examples 6-9 in Table 2 indicate that super-resolution operations are sufficiently carried out. Comparing these C/N values, the value corresponding to Example 6 is the lowest, while the value corresponding to Example 9 is the highest. The following describes why the values are different in such wise. As described below, since the optical multiple interference states of Example 6-9 are different from each other, temperatures of the temperature-sensitive films 32 are different between Examples 6-9, even if identical reproduction light is applied thereto. That is to say, the sensitivities with respect to the reproduction powers of the media are different from each other between Examples, and the optimum reproduction powers are also different between Examples. For the sake of comparison, the evaluations shown in Table 2 are carried out with respect to Examples with an identical reproduction power of 4.0 mW, so that the C/N value of Example 9 is the highest. However, the C/N value may be the highest on a different condition of power reproduction. Comparing the C/N values of Examples 6-9 with the optimum powers at which the C/N values peak, it is confirmed that all of these C/N values are about 35-40 dB. In Example 10, meanwhile, the interference structure is arranged so as to minimize the repeating reflections comparing to the other Examples, so that the C/N value is lower than those of the other examples 6 through 9.

The following will discuss the Examples in a more detailed manner.

As in Examples 6-10, the effect of the present invention is acquired when the wavelength at which the reflectance is minimum is in the range of ±80 nm of the reproduction wavelength (e.g. 405 nm). Furthermore, considering that in general the practical use can be realized when the C/N value is not less than 30 dB, it is preferable that the wavelength at which the reflectance is minimum is in the range of ±50 nm of the reproduction wavelength (e.g. 405 nm).

In reality, the wavelength at which the reflectance is minimized is about +40 nm in Example 9 and about +70 nm in Example 10, with respect to the reproduction wavelength. Note that, Examples 6-10 show only parts of the measurement result, as representative points. As indicated in the actual reflectance spectrum, the initial interference state at the reproduction wavelength does not radically change even when the wavelength at which the reflectance is minimized changes to some extent, and the initial interference state has no threshold value. According to the measurement result, in accordance with the mild and continuous change of the spectrum shape, the C/N value indicating the signal quality of the optical information recording medium also changes mildly and continuously. For instance, when the wavelength at which the reflectance is minimized is changed about 10 nm, the C/N value changes only few dB. Therefore, in Examples 6-10, it is considered that the signal quality is more or less the same, even if the wavelength at which the reflectance is minimized is changed about 10 nm.

The measurement result also clearly shows that the reflectance spectrum is influenced by the multiple interference, as peaks and troughs periodically appear. Focusing on the troughs, the back-and-forth deviation of the wavelength is equivalent to the back-and-forth deviation of optical phase. The absolute value on the short-wavelength side of the trough is identical with the absolute value on the long-wavelength side of the trough, and the reflectance on the short-wavelength side of the trough is also substantially identical with the reflectance on the long-wavelength side of the trough. In other words, the both sides of the trough are considered to be identical with each other. For this reason, it is considered that the effect of the present invention is acquired when the wavelength at which the reflectance is minimum is in the range of ±80 nm of the reproduction wavelength (e.g. 405 nm), and it is more preferable that the wavelength at which the reflectance is minimum is in the range of ±50 nm of the reproduction wavelength (e.g. 405 nm).

In Example 10, with the above-mentioned reproduction conditions, the C/N value is not sufficient compared to Examples 6-9. While the super-resolution reproduction is realized in Examples 6-9, the C/N value in Example 10 is insufficient even though this Example is identical with Examples 6-9 except the thickness of the ZnO film. This is because, according to the reflectance spectrum of Example 10 shown in FIG. 24, the peaks of the interference appear substantially at intervals of the reproduction wavelength (405 nm). In such a case, it is not possible to sufficiently acquire the change of the reflectance which occurs in accordance with the shift of the spectrum as shown in the foregoing Examples.

Furthermore, comparing to Examples 6-9, the initial value of the reflectance at the reproduction wavelength 405 nm is relatively high in Example 10. For this reason, even if the absolute value of the reflectance change is acquired, the rate of change of the reflectance is relatively small, bringing disadvantages to the super-resolution reproduction. Furthermore, unlike Examples 6-9, the spectrum in Example 10 locates at the trough of the interference. This lowers the degree of the multiple interference, and brings disadvantages to the temperature rise which is caused by the light irradiation and absorption. Thus, the amount of the shifting of the spectrum is small and the reflectance change is relatively small in Example 10.

Meanwhile, in Example 7, the minimum value of the reflectance spectrum appears at around the reproduction wavelength of 405 nm. In other words, the interference structure is antireflective. For this reason, when the rate of change of the reflectance increases as described in Example 1, the absorption of light is efficiently conducted and the temperature rise is facilitated, thanks to the antireflective structure. This contributes to the super-resolution reproduction of the present invention.

In the meantime, in Examples 6, 8, and 9, the antireflection does not occur at the reproduction wavelength of 405 nm. That is to say, the spectrum is not minimal and does not corresponds to the peak of the interference. For this reason, the spectrum shape is relatively steep at the reproduction wavelength of 405 nm. This steep change of the spectrum results in a great amount of reflectance change when the reflectance spectrum shifts in accordance with the temperature rise of the medium and the temperature-sensitive film 32. Furthermore, comparing to the state that the spectrum corresponds to the peak of the interference, the degree of the multiple interference increases, and the absorption of light is efficiently carried out and hence the temperature rise is facilitated. This contributes to the super-resolution reproduction of the present invention.

Note that, in Examples 7-9, the temperature rise of the medium as described in Example 1 causes the reflectance spectrum to shift toward the long wavelength side, so that the reflectance is on the rise at the reproduction wavelength of 405 nm. For this reason, the reflectance in the central area 111a, where the light intensity is strong, of the optical spot 111 in FIG. 21 increases, so that only the recording mark 112a in the area 111a is read.

However, as shown in FIG. 22, in Example 6, a similar spectrum shift causes the reflectance to decrease at the reproduction wavelength of 405 nm. In this case, the reflectance in the central area 111a where the light intensity is strong decreases, and hence the central area 111a functions as a mask. Thus, the recording mark 112 is read in the area 111b rather than in the central area 111a. That is to say, which area is masked differs in accordance with the direction of the change of the reflectance in response to the spectrum shifting, but the super-resolution is realized with both directions of the change.

The advantages of Examples 6-9 have been described. In Example 10, however, the super-resolution reproduction effect for reading pits not larger than the optical cutoff is acquired even if the C/N value is not really high. The values in Table 2 were measured with the reproduction power being fixed to 4.0 mW, for the sake of comparison. Thus, the optimum reproduction powers of respective Examples 6-10 are different from each other. Also in Example 10, it has been confirmed that, when, for instance, the reproduction power is increased to about 5.0 mW so that the temperature rise is stipulated and the amount of the spectrum shifting is increased, the rate of change of reflectance is larger than the rate in the condition (reproduction power is 4.0 mW) of Table 2 and the C/N value is increased (to 30.4 dB). That is to say, although being inferior to Examples 6-9, Example 10 can also realize higher recording density than the comparative example. Example 10 can thus realize the technical idea of the present invention, and bring about the effect of the present invention on condition that the wavelength at which the reflectance is minimum is in the range of ±80 nm with respect to the reproduction wavelength (e.g. 405 nm) as in Examples 6-10.

With the above-mentioned effect, the super-resolution reproduction is realized in Examples 6-10 as shown in Table 2. That is to say, although Example 1 exemplifies the antireflective structure, the present invention is not limited to this. As shown in Examples 6-10, the reflectance being influenced by the optical multiple interference in the film stack is, when the distribution of the wavelengths is measured, minimum in the range of ±80 nm of the reproduction wavelength. When the reflectance is in this range, the effect of the present invention is acquired. It is more preferable that the wavelength at which the reflectance is minimum is in the range of ±50 nm with respect to the reproduction wavelength.

Up to this point, the descriptions have been given from the viewpoint that in what range the minimum value of the reflectance spectrum is set with respect to the reproduction wavelength, with reference to Examples 6-10. More specifically, it has been confirmed that the effect of the present invention is acquired when the minimum value is in the range of ±80 nm of the reproduction wavelength. Now, the following discussion is given from the viewpoint of the thickness of the film.

The thicknesses of the temperature-sensitive film 32 of Examples 6-10 are in the range between 120 nm and 165 nm. However, the thickness of the temperature-sensitive film 32 is not necessarily limited to this range. The effect of the present invention depends on the change of the reflectance in the thin film section, which is caused by the change of the complex refractive index of the temperature-sensitive film 32 and the multiple interference. Considering this, not only the thickness of the temperature-sensitive film 32 but also the light path length including the complex refractive index are important to acquire the effect of the present invention. Thus, the effect of the present invention is acquired with the conditions of the complex refractive indices of the temperature-sensitive films 32 of Examples 6-10, i.e. when, at room temperatures, the complex refractive index is in the range of 120-165 nm, assuming that n (refractive index)=2.16 and k (extinction coefficient)=0.00. However, even in this condition of the complex refractive index, the effect of the present invention can still be acquired with the thickness not more than 120 nm or not less than 165 nm.

For example, it has already been described in Example 1 that the effect of the present invention is acquired with the thickness of 220 nm, and it has been confirmed that the super-resolution reproduction is similarly realized with the thickness of 50 nm, although not specifically described here. The condition for the thickness of 50 nm, 135 nm, and 220 nm is such that the value of the reflectance spectrum is minimum when the wavelength is approximate to the reproduction wavelength (405 nm). That is to say, when the above-described condition of the complex refractive index is met, the thickness of the film is not necessarily within the range of 120-165 nm, if the wavelength at which the reflectance spectrum is minimum is ±80 nm of the reproduction wavelength (405 nm). In other words, the thickness is determined in consideration of the wavelength at which the reflectance spectrum is minimum, so as not to be limited to the above-mentioned range.

As described above, the effect of the super-resolution reproduction is acquired with the arrangement (Examples 6-10) in which the optical interference structure is different from that of Example 1 despite being identically arranged except the thickness of the temperature-sensitive film 32. Also as to Examples 2-5, it has been confirmed that the effect of the super-resolution reproduction is acquired.

That is to say, although in the descriptions above Examples 2-5 are portrayed such that the optical interference is substantially arranged to be antireflective, the optical interference is in reality not necessarily antireflective. Thus, in Examples 2-5, the effect of the super-resolution reproduction is acquired even if the antireflective structure is not adopted. More specifically, also in Examples 2-5, the effect of the present invention is acquired on condition that the reflectance influenced by the optical multiple interference of the film stack, when there is no change in the complex refractive index of the complex refractive index changing film, is minimum when the wavelength is ±80 nm of the reproduction wavelength according to the measurement of the distribution of the wavelength. It is more preferable that the reflectance is minimum when the wavelength is ±50 nm of the reproduction wavelength.

Examples 6-10 have described the temperature-sensitive films 32 having different thicknesses. As described in Example 1, the optical multiple interference is virtually determined by the repeating reflections at the both end faces (light-incident face and the face opposing thereto) of the temperature-sensitive film 32. In other words, it is virtually possible to ignore all repeating reflections in all films except the temperature-sensitive film 32. For this reason, the state of the optical multiple interference in the thin film section can be controlled by only adjusting the thickness of the temperature-sensitive film 32. Furthermore, since the repeating reflections virtually occur only in the temperature-sensitive film 32, the change of the optical multiple interference is most reflected to the temperature-sensitive film 32, thereby directly influencing on the absorption of light and temperature rise. Utilizing this, the characteristics of the medium, typified by the sensitivity of the medium to the light intensity, is controlled by changing the thickness of the temperature-sensitive film 32.

As described in Example 1, the enhancement of the reflectance change utilizing the change of the refractive index n and the extinction coefficient k of the complex refractive index of the temperature-sensitive film can be used for Examples 6-10. For instance, in Example 6 in which the wavelength at which the spectrum is minimized is 380 nm and thus shorter than the light re[production wavelength, as described above, the complex refractive index (=n−ki where i is an imaginary number) of ZnO used for the temperature-sensitive film 32 is changed from n (refractive index)=2.16 and k (extinction coefficient) =0.00 at room temperatures to n=2.32 and k=0.07 at 200° C. This indicates that both n and k increases as the temperature increases. The increase of n elongates the light path of the temperature-sensitive film 32, so that the reflectance spectrum of Example k shifts toward the long wavelength side. Since the minimum value in Example 6 locates on the short wavelength side of the reproduction wavelength, the above-mentioned shift decreases the reflectance of the medium. Meanwhile, when k increases, the transmittance of the temperature-sensitive film 32 decreases, and hence the reflectance in Example 6 decreases. That is to say, the change of n and the change of k in accordance with the temperature change of ZnO both contribute to the decrease of the reflectance. In this manner, the change of reflectance due to the change of k and the change of reflectance due to the change of n enhance each other, so that the change of the complex refractive index of the temperature-sensitive film 32 is effectively reflected on the reflectance change, and the super-resolution reproduction is suitably carried out.

The present invention can be applied to optical information recording media such as a write-once optical disk, phase conversion optical disk, and magneto-optical disk which can store information, e.g. MD, MO, DVD-RAM, DVD-RW, DVD-R, and CD-R, on condition that a film stack includes a recording layer. Also, the present invention can be applied to a medium having a recording surface to which information is recorded in advance, such as a playback-only disk, e.g. CD, CD-ROM, DVD, and DVD-ROM.

The following will discuss the effects of the characteristic features claimed in the present invention. Note that, it is not necessary to combine a feature recited in one claim with a feature recited in another claim which is referred to by said one claim. As long as the objective of the present invention is achieved, a feature of one claim can be combined with a feature of another claim which is not referred to by said one claim.

(1) The optical information recording medium of the present invention may be arranged such that the wavelength distribution of the reflectance of the thin film section at room temperatures has a minimum value within ±50 nm of the wavelength of the incident light for reproduction.

Basically, when the optical information recording medium has an antireflection structure at room temperatures, the reflectance change is significant when the antireflection structure is cancelled out by the application of light, and the reflectance in the initial state is small. For this reason, the degree of the reflectance change is relatively high. Thus, the narrower the range of the minimum value of the wavelength distribution of the reflectance is, the higher the relative reflectance change is apt to be. Thus, high reflectance in an area in an optical spot, the area being smaller than the optical spot, can be easily acquired, so that the C/N of the super-resolution reproduction can be easily increased.

Comparing to a case that a reflection enhancing structure is formed with the reproduction wavelength, the degree of the reflectance change is high and the reflectance in the initial state is relatively low, so that the degree of the reflectance change is relatively high. For this reason, the reflected light in the area is intensified or masked. As a result, the effective reproduction spot is reduced and the super-resolution reproduction is realized. Note that, assuming that the antireflection structure corresponds to the bottom of the trough of wavelength distribution of the reflectance, the above-mentioned reflection enhancing structure corresponds to, on the contrary, the peak of the wavelength distribution of the reflectance. In other words, "reflection enhancing structure" is right opposite to "antireflection structure".

Furthermore, because of the multiple interference in the medium, the medium is apt to absorb light thanks to repeating interference, comparing to a case that the reflection enhancing structure is formed with the reproduction wavelength. Thus, the complex refractive index is changed relatively easily, so that the super-resolution reproduction is realized with a weaker laser power, and the sensitivity to the laser power is improved.

The wavelength distribution of the reflectance of the thin film section at room temperatures has a (substantially) minimum value around (e.g. within ±10 nm of) the wavelength of the incident light for reproduction.

According to this arrangement, the optical information recording medium is substantially antireflective at room temperatures, so that the high reflectance in an area in an optical spot, the area being smaller than the optical spot, can be acquired by applying light. Comparing to a case that the antireflection structure is not formed with the reproduction wavelength, the degree of the reflectance change is high and the reflectance in the initial state is small, so that the degree of the reflectance change is relatively high. As a result, a pit in the area is enhanced and read, so that the effective reproduction spot is reduced and the super-resolution reproduction is realized.

Since the antireflection structure is formed before the super-resolution reproduction, the degree of the multiple interference in the medium is high, the medium absorbs light relatively easily, and the complex refractive index changes relatively easily. Thus, comparing to a case that the antireflection structure is not formed with the reproduction wavelength, the super-resolution reproduction is realized with a weaker laser power, and the sensitivity to the laser power is improved.

(2) In the optical information recording medium of the present invention, the thickness of the optical multiple interference film may be arranged in such a manner as to set the reflectance of the thin film section at room temperatures to be more than a minimum value of the wavelength distribution of the reflectance and less than a maximum value of the wavelength distribution of the reflectance, the minimum value and the maximum value being adjacent to each other.

With this, the reflectance of the thin film section at room temperatures is within a wide range between the adjacent minimum and maximum values of the reflectance, making it possible to easily design the optical multiple interference film. This is because, as described above, in the present invention the reflectance change can be magnified without adopting the antireflection structure, as only one optical multiple interference film is provided.

(3) In the optical information recording medium of the present invention, said at least one thin film included in the thin film section is preferably made up of an inorganic material.

With this, since at least one thin film constituting the thin film section on the substrate is made of an inorganic material, a medium which cannot be easily degraded by the heat generated by the application of light and excels in durability for repeating playbacks or recordings and playbacks is acquired.

(4) The optical information recording medium of the present invention may be arranged such that, said at least one thin film further includes a recording layer for recording information, and said at least one thin film other than the recording layer is made of an inorganic material.

With this, since the layers other than the recording layer in the thin film section provided on the substrate are made of an inorganic material, a medium which cannot be easily degraded by the heat generated by the application of light and excels in durability for repeating playbacks or recordings and playbacks is acquired.

(5) In the optical information recording medium of the present invention, it is preferable that the reflectance of the thin film section changes when the intensity of the incident light becomes not less than a predetermined value.

With this, the reflectance influenced by the optical multiple interference in the thin film section rapidly changes when the intensity of the incident light becomes not less than a predetermined value. Thus, an intermediary transition area which is the border between a masked area and a reproduction area in the optical spot can be made narrower than that of an arrangement in which the reflectance smoothly changes in accordance with the incident light intensity. Thus, it is possible to read a recording bit in the reproduction area with further enhancement, so that the noise is reduced and the quality of signals is improved.

(6) In the optical information recording medium of the present invention, the optical multiple interference film may be a temperature-sensitive film whose complex refractive index changes in accordance with the temperature change.

According to this arrangement, since the optical multiple interference film is a temperature-sensitive film whose complex refractive index changes in accordance with the temperature change, the optical multiple interference in the thin film section changes in accordance with the temperature change in the optical spot formed in the thin film section, the temperature change being induced by the change of the intensity of the incident light. Since the complex refractive index is changed by the temperature change, a wider range of options for the optical multiple interference film becomes available. Furthermore, the reflectance can be controlled by controlling the optical multiple interference in the thin film section utilizing the temperature change, so that the thin film section can be easily designed.

(7) In the optical information recording medium of the present invention, it is preferable that, in accordance with a temperature change in the temperature-sensitive film, both a refractive index n and an extinction coefficient k of the complex refractive index of the temperature-sensitive film change, and a change of the reflectance of the thin film section due to a change of the refractive index n and a change of the reflectance of the thin film section due to a change of the extinction coefficient k enhance each other.

Thus, both the refractive index n and the extinction coefficient k are allowed to change, and this provides a wider range of options for the material of the temperature-sensitive film. Furthermore, the state of the multiple interference is adjusted by determining the thickness and complex refractive index of the temperature-sensitive film in such a manner as to cause the change of the reflectance of the thin film section due to the change of the refractive index n and the change of the reflectance of the thin film section due to the change of the extinction coefficient k enhance each other. With this, greater reflectance change is acquired using the same material of the temperature-sensitive film.

Because of the above, a wider range of options is available for the material of the temperature-sensitive film, and greater reflectance change is acquired by effectively utilizing the changes of n and k.

(8) In the optical information recording medium of the present invention, it is preferable that an extinction coefficient k of the complex refractive index of the optical multiple interference film at room temperatures is not more than 0.2.

When an extinction coefficient k of the complex refractive index of the optical multiple interference film at room temperatures is set to be not more than 0.2, the conditions required for an optical multiple interference film (complex refractive index film) which is highly transparent and allows to sufficiently acquire the effect of the optical multiple interference are substantially met. That is to say, the reflectance change in the thin film section can be increased even if the change of the complex refractive index is small. Also, the thickness of the optical multiple interference film can be increased, and this also contributes to the increase of the reflectance change in the thin film section.

Thus, selecting the optical multiple interference film in the above-mentioned manner makes it possible to easily realize the optical information recording medium which exerts the above-described effects. In addition to this, since the optical multiple interference film is highly transparent, a recording section multi-layered recording medium in which a plurality of thin film sections each including a recording surface or a recording layer is easily realized.

(9) In the optical information recording medium of the present invention, an oxide thin film including Zn, a sulfide film including Zn, an oxide thin film including Ce, or an oxide thin film including Sn may be adopted as the temperature-sensitive film.

Adopting such a film to the temperature-sensitive film, an optical multiple interference film which is highly transparent and allows to sufficiently acquire the effect of the optical multiple interference is acquired, so that the optical information recording medium exerting the above-mentioned effects is easily realized.

(10) In the optical information recording medium of the present invention, said at least one thin film of the thin film section may further include a reflective film which reflects the incident light having passed through the optical multiple interference film.

The reflective film being thus provided, the reflectance of the reflected incident light having passed through the temperature-sensitive film can be increased, so that the efficiency of the use of light can be improved.

(11) In the optical information recording medium of the present invention, said at least one thin film of the thin film section may further include a light-absorbing film which generates a part of light thereby generating heat.

The light-absorbing film being thus provided, a part of the incident light is absorbed and the temperature of the thin film section is increased, so that the temperature rise of the temperature-sensitive film is facilitated.

In this case, it is preferable that the light-absorbing film is in touch with the temperature-sensitive film, and the temperature-sensitive film and the light-absorbing film are provided in this order from the incident-light side. This makes it possible to efficiently change the temperature of the temperature-sensitive film.

When the light-absorbing film is provided, it is preferable that a reflective film reflecting the incident light having passed through the temperature-sensitive film is provided on a side opposite to the temperature-sensitive film side of the light-absorbing film. The reflective film being thus provided, the reflectance is increased by reflecting the incident light having passed through the temperature-sensitive film, so that the efficiency of the use of light is increased.

When the light-absorbing film and the reflective film are provided, it is preferable that a heat insulation film which prevents the heat of the light-absorbing film from diffusing to thin films other than the temperature-sensitive film is provided.

Moreover, when the light-absorbing film is provided, it is more preferable to provide a heat insulation film on a side opposite to the temperature-sensitive film side of the light-absorbing film, and restrains heat diffusion from the light-absorbing film to the side opposite to the temperature-sensitive film side of the light-absorbing film. Thus, the temperature of the temperature-sensitive film is efficiently changed.

It is more preferable to provide a protective film on a side opposite to the temperature-sensitive film side of the light-absorbing film. With this, the light-absorbing film absorbs light and the temperature thereof increases, so that they degradation of the light-absorbing film is prevented by the protective film. Note that, the protective film is preferably in touch with the light-absorbing film.

On this occasion, adopting a transparent film as the heat insulating film or the protective film makes it possible to allow a large amount of light to pass through and thus facilitate the use of passing light. This is advantageous for realizing a multilayer arrangement.

(12) In the optical information recording medium of the present invention, the thin film section may be provided on the incident-light side of the substrate.

With this, since the thin film section is provided on the incident-light side of the substrate, the aberration caused by the tilt or birefringence of the substrate is restrained, so that the high density is easily realized compared to a case that light enters to the thin film section after passing through the substrate.

Also in this case, the temperature-sensitive film is provided on the incident-light surface of the thin film section, so that the temperature-sensitive film is exposed to the air. Since the air functions as an insulating material, the heat is not easily diffused fro the temperature-sensitive film, so that the temperature of the temperature-sensitive film is effectively changed.

In the optical information recording medium of the present invention, a resin film for protecting the thin film section may be provided on the incident-light side of the thin film section. With this, the thin film section is protected by the resin film.

On the contrary to the above, in the optical information recording medium of the present invention, the substrate may be provided on the incident-light side of the thin film section.

With this, since the substrate is provided on the incident-light side of the thin film section, the thin film section is protected. Furthermore, a reading error rarely occurs even if the substrate is damaged.

In the optical information recording medium of the present invention, two or more thin film sections identical with the above-mentioned thin film section may be provided.

Since two or more thin film sections are provided on the substrate, a multi-layered recording section structure in which a plurality of recording layers or a plurality of recording surfaces each recording information in the form of irregularities is realized without changing the size of the optical information recording medium, so that the storage capacity is increased.

In this case, the distance between the neighboring thin film sections is preferably within the range between 2 µm and 20 µm. Forming the distance in this way makes it easy to realize the multi-layered recording section structure, improves the accuracy, and increases the manufacturing efficiency.

(13) A method for optical information reproduction of the present invention is characterized in that, a light beam is applied to the above-described optical information recording medium, the reflectance of the thin film section is changed by changing the optical multiple interference, so that information in the form of a mark shorter than the diameter of an optical beam spot is read.

An optical information processing device of the present invention is characterized by carrying out at least information reproduction using the optical information recording medium of the present invention and the method for optical information reproduction of the present invention.

This arrangement makes it possible to further increase the recording density, with no significant modifications to a conventional device. Furthermore, regarding an optical information recording medium suitable for increasing the number of recording layers or recording surfaces, information can be read from a mark shorter than the diameter of the optical beam spot.

(14) Changing the point of view, it can be said that the present invention has the following characteristics. That is, the optical information recording medium of the present invention is made up of a substrate and a film stack including at least a recording layer, and the film stack is made up of at least two thin films, the layers of the film stack are made of an inorganic material, other than the recording layer, and the reflectance of the film stack changes in accordance with the change of the optical multiple interference in the film stack.

In the above-described optical information recording media, the reflectance may be, when the intensity of the incident light is increased to be not less than a predetermined value, greatly changes in accordance with the change of the optical multiple interference of the film stack.

Furthermore, the above-described optical information recording media may be arranged in such a manner that at least one layer of the film stack is a light transmission film which allows the incident light to pass through, and the film stack may have an antireflection structure or substantially-antireflection structure thanks to the optical multiple interference, around the wavelength of the incident light.

The light transmission film may be a temperature-sensitive film whose complex refractive index changes in accordance with the change of the temperature of the film stack caused by the change of the intensity of the incident light.

A recording/reproduction device of the present invention is characterized by reading a signal from a mark which is shorter than an optical system resolution limit of the recording/reproduction device and recording a signal in the form of such a mark, using the optical information recording medium of the present invention.

A reproduction device of the present invention is characterized by reading a signal from a mark which is shorter than an optical system resolution limit of the reproduction device, using the optical information recording medium of the present invention.

Note that, the optical information recording medium of the present invention may be characterized in that a film stack on a substrate includes a complex refractive index changing film which excels in transparency and whose complex refractive index changes in accordance with the intensity of the incident light, and if a recording layer for recording information is included, thin films other than the recording layer are made of an inorganic material. In this case, when light whose intensity is not lower than a predetermined intensity is applied as a light beam, the complex refractive index of the complex refractive index changing film changes, so that the optical multiple interference of the film stack changes and the reflectance in the film stack significantly changes. Thus, to acquire medium super-resolution effect using an inorganic super-resolution film which can endure repeating reproductions, it is possible to provide an optical information recording medium (i) in which the recording density is improved by effectively reducing the diameter of the effective spot by increasing the reflectance change in the film stack including the inorganic super-resolution film, and (ii) which is suitable for increasing the number of recording layers or recording surfaces.

The invention being thus described, it will be obvious that the same way may be changed in many ways. Such changes are not to be regarded as a departure from the spirit and scope of the invention, and all such modifications as would be obvious to one skilled in the art are intended to be included within the scope of the following claims.

What is claimed is:

1. An optical information recording medium, comprising:
 a thin film section made up of at least one thin film, the thin film section being provided on a substrate, and reflectance of the thin film section changing in accordance with a change of optical multiple interference in the thin film section,
 said at least one thin film of the thin film section including a single optical interference film in which a complex refractive index changes in accordance with intensity of incident light, thereby triggering the optical multiple interference in the thin film section, and
 a composition and a thickness of the optical multiple interference film are determined in such a manner as to cause wavelength distribution of reflectance of the thin film section at room temperatures to have a minimum value within ±80 nm of a wavelength of incident light for reproduction,
 wherein, the optical multiple interference film is a temperature-sensitive film whose complex refractive index changes in accordance with a temperature change, and
 wherein, regarding the complex refractive index (=n−ki where i is an imaginary number) of the temperature-sensitive film, an extinction coefficient k at room temperatures is within a range of $0 \leq k \leq 0.2$, and an absolute value of a difference between a refractive index n1 after an application of light and a refractive index n0 at room temperatures meets $|n1-n0|>0.02$.

2. An optical information recording medium, comprising:

a thin film section made up of at least one thin film, the thin film section being provided on a substrate, and reflectance of the thin film section changing in accordance with a change of optical multiple interference in the thin film section, said at least one thin film of the thin film section including a single optical interference film in which a complex refractive index changes in accordance with intensity of incident light, thereby triggering the optical multiple interference in the thin film section, and a composition and a thickness of the optical multiple interference film are determined in such a manner as to cause wavelength distribution of reflectance of the thin film section at room temperatures to have a minimum value within ±80 nm of a wavelength of incident light for reproduction;

wherein, the optical multiple interference film is a temperature-sensitive film whose complex refractive index changes in accordance with a temperature change, and wherein, regarding the complex refractive index (=n−ki where i is an imaginary number) of the temperature-sensitive film, an extinction coefficient k1 after an application of light and an extinction coefficient k0 at room temperatures meet $0 \leq k1 \leq k0$.

* * * * *